(12) United States Patent
Ozawa et al.

(10) Patent No.: US 7,440,054 B2
(45) Date of Patent: *Oct. 21, 2008

(54) TRANSFLECTIVE LIQUID CRYSTAL DEVICE WITH PARTICULAR REFLECTIVE LAYER AND THICKNESS ADJUSTING LAYER STACKING AND ELECTRONIC APPARATUS USING THE SAME

(75) Inventors: Kinya Ozawa, Suwa (JP); Nobutaka Urano, Suwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/784,037

(22) Filed: Feb. 20, 2004

(65) Prior Publication Data

US 2004/0165130 A1    Aug. 26, 2004

Related U.S. Application Data

(62) Division of application No. 10/255,121, filed on Sep. 25, 2002.

(30) Foreign Application Priority Data

Sep. 25, 2001  (JP)  .............................. 2001-292642
Jan. 11, 2002  (JP)  .............................. 2002-005249

(51) Int. Cl.
   *G02F 1/1335* (2006.01)
(52) U.S. Cl. ..................................... 349/114
(58) Field of Classification Search ................. 349/114, 349/113
   See application file for complete search history.

(56) References Cited

U.S. PATENT DOCUMENTS 5,771,082 A * 6/1998 Chaudet et al. ............... 349/39
6,195,140 B1 * 2/2001 Kubo et al. ................... 349/44
6,281,952 B1 * 8/2001 Okamoto et al. .............. 349/12
6,295,109 B1 * 9/2001 Kubo et al. ................. 349/119
6,476,889 B2  11/2002 Urabe (Continued)

FOREIGN PATENT DOCUMENTS

JP    11-44814    2/1999

(Continued)

OTHER PUBLICATIONS

Communication from Japanese Patent Office regarding related application.

(Continued)

*Primary Examiner*—Timothy Rude
(74) *Attorney, Agent, or Firm*—Harness, Dickey & Pierce, P.L.C.

(57) ABSTRACT

A liquid crystal device 1 includes a transparent first substrate 10 having first transparent electrodes 11 on the surface thereof, a transparent second substrate 20 having second transparent electrodes 21, and a liquid crystal layer 50. Pixel regions 3 have a light-reflecting layer 4 defining reflective display regions 31 and transmissive display regions 32. A thickness-adjusting layer 6 having opening 61 defining the transmissive display regions 32 is formed on the light-reflecting layer 4. The thickness-adjusting layer 6 forms slopes 60 at the boundaries between the reflective display regions 31 and the transmissive display regions 32. The top edges 65 of the slopes are aligned with the edges 45 of the light-reflecting layer 4.

7 Claims, 25 Drawing Sheets

U.S. PATENT DOCUMENTS

| | | | |
|---|---|---|---|
| 6,522,377 B2* | 2/2003 | Kim et al. | 349/114 |
| 6,532,045 B2* | 3/2003 | Chung et al. | 349/43 |
| 6,542,209 B2* | 4/2003 | Kim et al. | 349/106 |
| 6,563,554 B2* | 5/2003 | Okamoto et al. | 349/12 |
| 6,570,634 B2* | 5/2003 | Kim | 349/107 |
| 6,580,480 B2* | 6/2003 | Baek et al. | 349/114 |
| 6,614,496 B1* | 9/2003 | Song et al. | 349/114 |
| 6,657,689 B2* | 12/2003 | Baek | 349/114 |
| 6,710,827 B2* | 3/2004 | Kubo et al. | 349/55 |
| 6,819,379 B2* | 11/2004 | Kubo et al. | 349/114 |
| 6,831,721 B2 | 12/2004 | Maeda et al. | |
| 6,862,059 B2 | 3/2005 | Murai et al. | |
| 6,950,159 B2* | 9/2005 | Kubo et al. | 349/114 |
| 6,956,632 B2* | 10/2005 | Ozawa et al. | 349/114 |
| 7,009,669 B2* | 3/2006 | Ozawa et al. | 349/114 |
| 7,015,996 B2 | 3/2006 | Sakamoto et al. | |
| 7,088,408 B2* | 8/2006 | Ozawa et al. | 349/114 |
| 7,102,714 B2* | 9/2006 | Tsuchiya et al. | 349/114 |
| 7,119,861 B2* | 10/2006 | Tsuchiya et al. | 349/108 |
| 2001/0046014 A1* | 11/2001 | Ohtake et al. | 349/114 |
| 2002/0033918 A1* | 3/2002 | Shigeno et al. | 349/114 |
| 2002/0118323 A1* | 8/2002 | Itou et al. | 349/113 |
| 2003/0076463 A1 | 4/2003 | Oazawa et al. | |
| 2003/0076464 A1 | 4/2003 | Ozawa et al. | |
| 2003/0160928 A1* | 8/2003 | Ozawa et al. | 349/129 |
| 2004/0061816 A1* | 4/2004 | Tsuchiya et al. | 349/113 |
| 2006/0007363 A1* | 1/2006 | Ozawa et al. | 349/1 |
| 2006/0256266 A1* | 11/2006 | Tsuchiya et al. | 349/114 |
| 2006/0285035 A1* | 12/2006 | Tsuchiya et al. | 349/106 |
| 2007/0064193 A1* | 3/2007 | Kurasawa | 349/155 |
| 2007/0091233 A1* | 4/2007 | Maeda | 349/114 |

FOREIGN PATENT DOCUMENTS

| | | |
|---|---|---|
| JP | 11-101992 | 4/1999 |
| JP | 11-0242226 | 9/1999 |
| JP | 11-316382 | 11/1999 |
| JP | 2000-180881 | 6/2000 |
| JP | 2000-187210 | 7/2000 |
| JP | 2000-267081 | 9/2000 |
| JP | 2000-275660 | 10/2000 |
| JP | 2000-305099 | 11/2000 |
| JP | 2000-305110 | 11/2000 |
| JP | 2001-166289 | 6/2001 |
| JP | 2001-221995 | 8/2001 |
| JP | 2001-281648 | 10/2001 |
| JP | 2001-318377 A | 11/2001 |
| JP | 2003-156756 | 5/2003 |
| JP | 2003-172923 | 6/2003 |
| JP | 2003-233063 | 8/2003 |
| JP | 2003-262852 | 9/2003 |
| JP | 2003-270628 | 9/2003 |
| JP | 2003-270727 | 9/2003 |
| JP | 2003-344836 | 12/2003 |

OTHER PUBLICATIONS

Communication from Japanese Patent Office regarding related application.
Communication from Korean Patent Office re: counterpart application.
Examination result issued in corresponding Japanese application.
Communication from the Japanese Patent Office regarding corresponding application.

* cited by examiner (A)

(B)

(A)

(B)

TRANSFLECTIVE LIQUID CRYSTAL DEVICE WITH PARTICULAR REFLECTIVE LAYER AND THICKNESS ADJUSTING LAYER STACKING AND ELECTRONIC APPARATUS USING THE SAME

RELATED APPLICATIONS

This application is a division of U.S. application Ser. No. 10/255,121 filed on Sep. 25, 2002 which claims priority to Japanese Application No. 2001-292642 filed Sept. 25, 2001 and 2002-005249 filed Jan. 11, 2002. The disclosures of the above applications are incorporated herein by reference.

BACKGROUND OF THE INVENTION

1. Technical Field of the Invention

The present invention relates to transflective liquid crystal devices. In particular, the present invention relates to multi-gap type liquid crystal devices in which the thickness of a liquid crystal layer between a transmissive display region and a reflective display region in each pixel is changed to a suitable value.

2. Description of the Related Art

In various types of liquid crystal devices, those which are capable of displaying both in a transmissive mode and in a reflective mode are referred to as transflective liquid crystal devices and are used in all scenes.

As shown in (A), (B), and (C) of FIG. 24, a transflective liquid crystal device has a transparent first substrate 10 having a first transparent electrode 11, a transparent second substrate 20 having a second transparent electrode 21 opposing the first transparent electrode 11, and a TN (twisted nematic) liquid crystal layer 5 held between the first substrate 10 and the second substrate 20. The first substrate 10 has a lightreflecting layer 4 defining a reflective display region 31 in a pixel region 3 where the first transparent electrode 11 opposes the second transparent electrode 21. An opening 40 in the light-reflecting layer 4 defines a transmissive display region 32. The outer surfaces of the first substrate 10 and the second substrate 20 have polarizers 41 and 42, respectively, and a backlight device 7 opposes the polarizer 41.

In the liquid crystal device 1 having such a structure, light emitted from the backlight device 7 and entering the transmissive display region 32 enters the liquid crystal layer 5 through the first substrate 10. The light is modulated in the liquid crystal layer 5 and emitted from the second substrate 20 to serve as transmissive display light to display images (transmissive mode), as indicated by Arrow L1.

On the other hand, light entering the reflective display region 31 through the second substrate 20 reaches the reflecting layer 4 through the liquid crystal layer 5. The light is reflected at the reflecting layer 4 and emitted from the second substrate 20 through the liquid crystal layer 5 to serve as reflective display light to display images (reflective mode), as indicated by Arrow L2.

In the first substrate 10, the reflective display region 31 and the transmissive display region 32 are provided with a reflective-display color filter 81 and a transmissive-display color filter 82, respectively, so that color images can be displayed.

In such optical modulation, if the twist angle of liquid crystal is set small, the change in polarization is expressed as a function of the product of the difference Δn between refractive indexes and the thickness d of the liquid crystal layer 5 (retardation Δn·d). Therefore, by appropriately setting this value, the visibility of images can be improved. In the transflective liquid crystal device 1, however, while the transmissive display light passes through the liquid crystal layer 5 only once, the reflective display light passes through the liquid crystal layer 5 twice. Therefore, it is difficult to optimize the retardations Δn·d of both the transmissive display light and the reflective display light. Specifically, when the thickness d of the liquid crystal layer 5 is set so that the visibility in the reflective mode is improved, images in the transmissive mode are degraded. In contrast, when the thickness d of the liquid crystal layer 5 is set so that the visibility in the transmissive mode is improved, images in the reflective mode are degraded.

Japanese Unexamined Patent Application Publication. 11-242226 discloses a structure in which the thickness d of the liquid crystal layer 5 in the reflective display region 31 is set smaller than the thickness d of the liquid crystal layer 5 in the transmissive display region 32. This structure is referred to as a multi-gap type and is realized, for example, by providing a thickness-adjusting layer 6 having an opening 61 formed in the region corresponding to the transmissive display region 32, under the first transparent electrode 11 and above the light-reflecting layer 4, as shown in (A), (B), and (C) of FIG. 24. Specifically, since the thickness d of the liquid crystal layer 5 in the transmissive display region 32 is larger than that in the reflective display region 31 by the thickness of the thickness-adjusting layer 6, the retardations Δn·d of both the transmissive display light and the reflective display light can be optimized. In order to adjust the thickness d of the liquid crystal layer 5, the thickness of the thickness-adjusting layer 6 formed must be large. Such a thick layer is formed of a photosensitive resin or the like.

When the thickness-adjusting layer 6 is formed of a photosensitive resin, photolithography is used. However, the thickness-adjusting layer 6 inevitably has slopes 60 diverging upward at the boundary between the reflective display region 31 and the transmissive display region 32 because of the low exposure accuracy and side etching caused by development during the photolithography. As a result, the thickness d of the liquid crystal layer 5 changes continuously at the boundary between the reflective display region 31 and the transmissive display region 32, and the retardation Δn·d continuously changes accordingly. Also, the initial orientation of liquid crystal molecules contained in the liquid crystal layer 5 is determined by alignment layers 12 and 22 formed on the innermost surfaces of the first substrate 10 and the second substrate 20. However, since the alignment strength of the alignment layer 12 acts in tilted directions in the slopes 60, the orientation of the liquid crystal molecules is disordered in these areas, as schematically shown in FIG. 25, and thus disclination occurs.

For example, if the known liquid crystal device 1 is designed for use in a normally white mode, the entire image should be displayed black while an electric field is applied. However, light leaks from the region corresponding to the slopes 60 and, thus, display failures, such as contrast degradation, occur. FIG. 26 (A) shows the results of a simulation for estimating the distribution of the reflected light intensity for each rubbing direction from the reflective display region 31 to the transmissive display region 32 when the entire image is displayed black. As shown in FIG. 26(A), light leaks at the boundary between the reflective display region 31 and the transmissive display region 32. This continuously variable light leakage is caused by an unsuitable retardation Δn·d and the sharp peak of the light leakage is caused by an alignment failure of liquid crystal. FIG. 26 (B) shows the results of a simulation for estimating the distribution of the transmitted light intensity for each rubbing direction from the reflective display region 31 to the transmissive display region 32 when the entire image is displayed black. As shown in FIG. 26(B), light leaks at the boundary between the reflective display region 31 and the transmissive display region 32. This continuously variable light leakage is also caused by an unsuitable retardation Δn·d and the sharp peak of the light leakage is caused by an alignment failure of liquid crystal. The leakage level of the transmitted light is notably lower than that of the reflected light.

Accordingly, one object of the present invention is to provide a multi-gap type liquid crystal device in which the thickness of the liquid crystal layer is changed to proper values from the transmissive display region to the reflective display region in one pixel region and to provide an electronic apparatus using the liquid crystal device. In the structure of the liquid crystal device, even if the retardation is not proper or the orientation of the liquid crystal molecules is not aligned, high-quality images can still be displayed.

SUMMARY OF THE INVENTION

In order to solve the problems, a transflective liquid crystal device of the present invention comprises: a first substrate having first transparent electrodes on a surface thereof; a second substrate having second transparent electrodes on a surface thereof, the second transparent electrodes opposing the first transparent electrodes; and a liquid crystal layer held between the first substrate and the second substrate. The first substrate includes: a light-reflecting layer defining reflective display regions in pixel regions where the first transparent electrodes oppose the second transparent electrodes and transmissive display regions in the regions of the pixel regions other than the reflective display regions; a thickness-adjusting layer (e.g., variable thickness layer) for causing the thickness of the liquid crystal layer in the reflective display regions to be smaller than the thickness of the liquid crystal layer in the transmissive display regions; and the first transparent electrodes, in that order, in the upward direction. At the boundary between each reflective display region and transmissive display region, slopes formed at ends of the thickness-adjusting layer substantially overlap with edges of the light-reflecting layer in plan view.

According to the present invention, since the regions where the light-reflecting layer and the slopes formed at the ends of the thickness-adjusting layer overlap each other at the boundaries between the reflective display regions and the transmissive display regions do not transmit light, the amount of light transmitted through and emitted from the slopes can be reduced in a transmissive mode. Therefore, even if the retardation Δn·d continuously changes according to the continual change in the thickness of the thickness-adjusting layer at the boundaries between the reflective display regions and the transmissive display regions, and even if the orientation of the liquid crystal molecules is not aligned, the amount of light transmitted through and emitted from such regions can be reduced in a transmissive mode.

Also, since the regions where the light-reflecting layer and the slopes formed at the ends of the thickness-adjusting layer do not overlap at the boundaries between the reflective display regions and the transmissive display regions do not reflect light, the amount of light transmitted through and emitted from the slopes can be reduced in a reflective mode. Therefore, even if the retardation Δn·d continuously changes according to the continual change in the thickness of the thickness-adjusting layer at the boundaries between the reflective display regions and the transmissive display regions, and even if the orientation of the liquid crystal molecules is not aligned, the amount of light transmitted through and emitted from such a region can be reduced in a reflective mode.

Thus, the contrast and the quality of images can be improved in both the transmissive mode and the reflective mode. Also, since the amount of display light does not decrease as compared to when the entire boundary between the reflective display regions and the transmissive display regions is covered with a shading film, bright images can be displayed.

In particular, the edges of the light-reflecting layer may be substantially aligned with the top edges of the slopes formed at the ends of the thickness-adjusting layer at the boundaries between the reflective display regions and the transmissive display regions. In this structure, the light-reflecting layer is not formed in the region overlapping with the slopes formed at the ends of the thickness-adjusting layer at the boundaries between the reflective display regions and the transmissive display regions.

As a result, reflected light does not enter the boundaries between the reflective display regions and the transmissive display regions (the regions where the thickness-adjusting layer forms the slopes at the ends thereof). Therefore, even if the retardation Δn·d continuously changes according to the continual change in the thickness of the thickness-adjusting layer at the boundaries between the reflective display regions and the transmissive display regions, and even if the orientation of the liquid crystal molecules is not aligned, light does not leak from such regions in a reflective mode.

Thus, high-contrast high-quality images can be displayed. Also, since the amount of display light does not decrease in comparison with when the entire boundary between the reflective display regions and the transmissive display regions is covered with the shading film, bright images can be displayed.

Also, at the boundaries between the reflective display regions and the transmissive display regions, the edges of the light-reflecting layer may be substantially aligned with the bottom edges of the slopes formed at the ends of the thickness-adjusting layer. In this structure, the light-reflecting layer overlaps with the slopes formed at the ends of the thickness-adjusting layer at the boundaries between the reflective display regions and the transmissive display regions, in plan view. As a result, transmitted light does not enter the boundaries between the reflective display regions and the transmissive display regions (the regions where the thickness-adjusting layer forms the slopes at the ends thereof). Therefore, even if the retardation Δn·d continuously changes according to the continual change in the thickness of the thickness-adjusting layer at the boundaries between the reflective display regions and the transmissive display regions, and even if the orientation of the liquid crystal molecules is not aligned, light does not travel through such regions in a transmissive mode. Thus, high-contrast high-quality images can be displayed. Also, since the amount of display light does not decrease in comparison with when the entire boundary between the reflective display regions and the transmissive display regions is covered with a shading film, bright images can be displayed.

According to another aspect of the present invention, a transflective liquid crystal device comprises: a first substrate having first transparent electrodes on a surface thereof; a second substrate having second transparent electrodes on a surface thereof, the second transparent electrodes opposing the first transparent electrodes; and a liquid crystal layer held between the first substrate and the second substrate. The first substrate comprises: a light-reflecting layer defining reflective display regions in pixel regions where the first transparent electrodes oppose the second transparent electrodes and transmissive display regions in the regions of the pixel regions other than the reflective display regions; a thickness-adjusting (e.g., variable thickness) layer for causing the thickness of the liquid crystal layer in the reflective display regions to be smaller than the thickness of the liquid crystal layer in the transmissive display regions; and the first transparent electrodes, in that order, in the upward direction. Each pixel region is rectangular, each transmissive display region is rectangular and has a side defining the transmissive display region and positioned in the clear viewing direction, and the side overlaps with a side defining the pixel region, in plan view. Also, a shading film is formed so as to substantially overlap, in plan view, the sides which overlap each other.

In this structure, at the boundaries between the reflective display regions and the transmissive display regions, the edges of the light-reflecting layer may be disposed in the region substantially overlapping, in plan view, with the slopes formed at the ends of the thickness-adjusting layer. The edges of the light-reflecting layer may overlap with the top edges of the slopes formed at the ends of the thickness-adjusting layer. Alternatively, the edges of the light-reflecting layer may overlap with the bottom edges of the slopes formed at the ends of the thickness-adjusting layer.

In liquid crystal devices, light leakage is generally liable to be visually noticed at a side positioned in the clear viewing direction at the periphery of the transmissive display regions. In the present invention, however, the side positioned in the clear viewing direction overlaps with a side defining the pixel regions. Since, at the boundaries between adjacent pixel regions, shading films referred to as a black matrix or black stripes or shading wires run, the light to leak through the side positioned in the clear viewing direction at the periphery of the transmissive display regions is blocked with the shading films. Thus, high-contrast high-quality images can be displayed. Also, since the amount of display light does not decrease as compared to when the entire boundary between the reflective display regions and the transmissive display regions is covered with the shading film, bright images can be displayed.

Preferably, the sides defining each pixel region and transmissive display region and overlapping with each other are adjacent to the reflective display region of an adjacent pixel region.

In this structure, since the sides positioned in the clear viewing direction of the transmissive display regions are each adjacent to a reflective display region of an adjacent pixel region, the light which would otherwise leak through the boundaries between the transmissive display regions and the adjacent reflective display regions (the regions where the thickness-adjusting layer forms the slopes) is blocked with the shading films. Therefore, even if the retardation $\Delta n \cdot d$ continuously changes according to the continual change in the thickness of the thickness-adjusting layer at the boundaries between the reflective display regions and the transmissive display regions, and even if the orientation of the liquid crystal molecules is not aligned, part or all of the light to pass through these regions is blocked with the shading layer and, thus, the contrast and the quality of images can be improved. Also, since the amount of display light does not decrease in comparison with when the entire boundary between the reflective display regions and the transmissive display regions is covered with the shading film, bright images can be displayed.

Preferably, the liquid crystal device further comprises reflective-display color filters in the reflective display regions and transmissive-display color filters, which are colored more strongly than the reflective-display color filters, in the transmissive display regions.

In this structure, the difference between color tones of lights produced by passing through the color filters twice in a reflective mode and by passing through the color filters once in a transmissive mode can be reduced, and thus the visibility can be improved.

In particular, at the boundaries between the reflective display regions and the transmissive display regions, the edges of the reflective-display color filters may substantially overlap with the edges of the light-reflecting layer in plan view. In this structure, since light reflected at the light-reflecting layer can surely pass through the reflective-display color filters, the visibility is further improved.

Alternatively, at the boundaries between the reflective display regions and the transmissive display regions, overlaps may be formed by depositing at least two layers having different colors and forming the reflective-display color filters and/or the transmissive-display color filters.

By depositing at least two colored layers to form the overlaps, the light absorption of the overlaps can be increased. As a result, the amount of light transmitted through and emitted from the overlaps decreases and, thus, the overlaps become dark visually. Therefore, even if the retardation $\Delta n \cdot d$ continuously changes according to the continual change in the thickness of the thickness-adjusting layer at the boundaries between the reflective display regions and the transmissive display regions, and even if the orientation of the liquid crystal molecules is not aligned, light leaking from these regions becomes inconspicuous because part of the light is absorbed by the overlaps. Thus, high-contrast high-quality images can be displayed.

In particular, the edges of the reflective-display color filters and the edges of the transmissive-display color filters may overlap with each other in the overlaps. In this structure, overlaps can be relatively easily formed.

Preferably, the thickness-adjusting layer forms slopes at ends thereof at the boundaries between the reflective display regions and the transmissive display regions, and the slopes are positioned in the regions overlapping with the overlaps in plan view.

Even if the retardation $\Delta n \cdot d$ continuously changes at the slopes where the thickness of the thickness-adjusting layer continuously changes, and even if the orientation of the liquid crystal molecules is not aligned, this structure ensures that light leaking from these regions passes through the overlaps, so that the light becomes inconspicuous.

Preferably, the thickness-adjusting layer forms the slopes at the ends thereof at the boundaries between the reflective display regions and the transmissive display regions, and the width of the slopes in plan view is 8 µm or less.

The twist angle of the liquid crystal in the liquid crystal layer of the present invention is preferably 90° or less.

The transflective liquid crystal device of the present invention can be used as display units of electronic apparatuses such as cellular phones and mobile computers.

DETAILED DESCRIPTION OF THE PREFERRED EMBODIMENTS

Figure 1A:
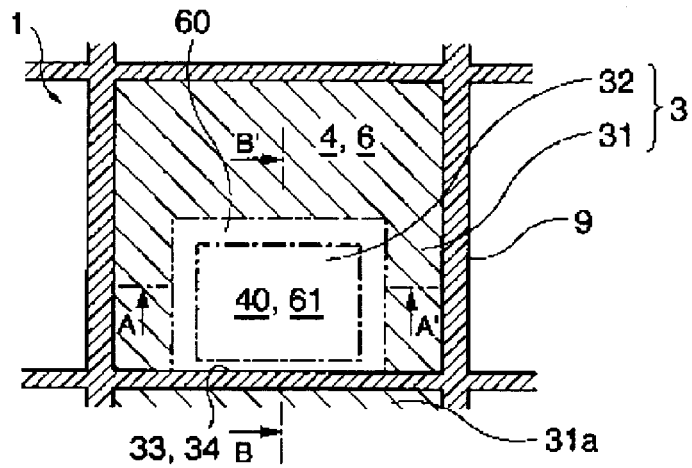
FIGS. 1(A), (B) and (C) are a schematic plan view of one of a plurality of pixel regions formed in a matrix of a transflective liquid crystal device according to Embodiment 1 of the present invention in (A), a sectional view taken along line A—A' in (B), and a sectional view taken along line B—B' in (C), respectively.

Embodiments of the present invention will now be described with reference to the drawings. The scales of layers and parts in the drawings used for the following description are allowed to differ so that the layers and the parts can be identified in the drawings.

Embodiment 1

Figure 1B:
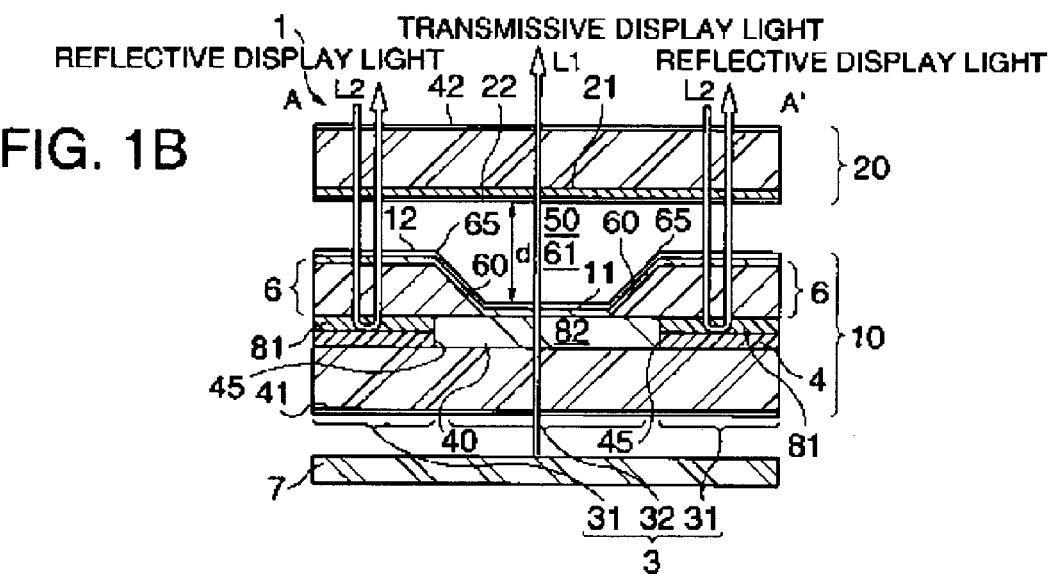
Figure 1C:
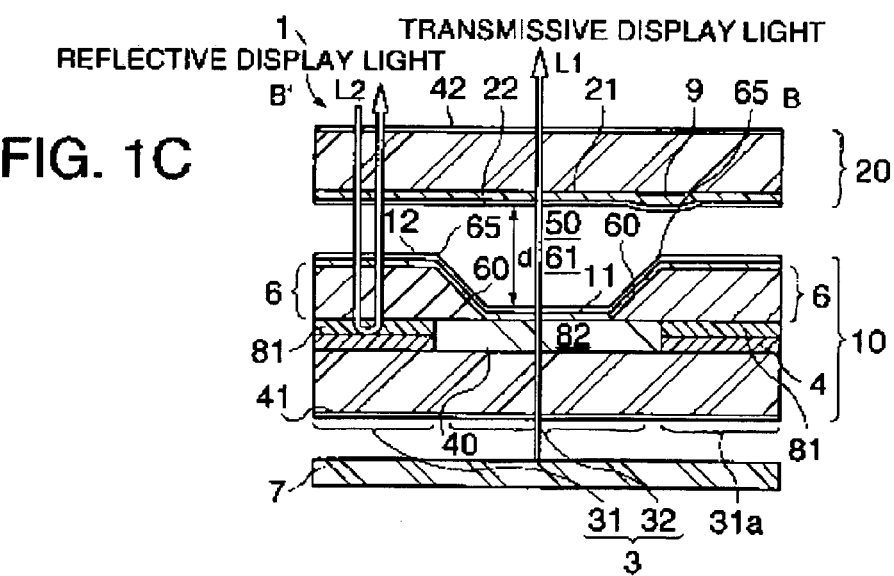
Figure 2:
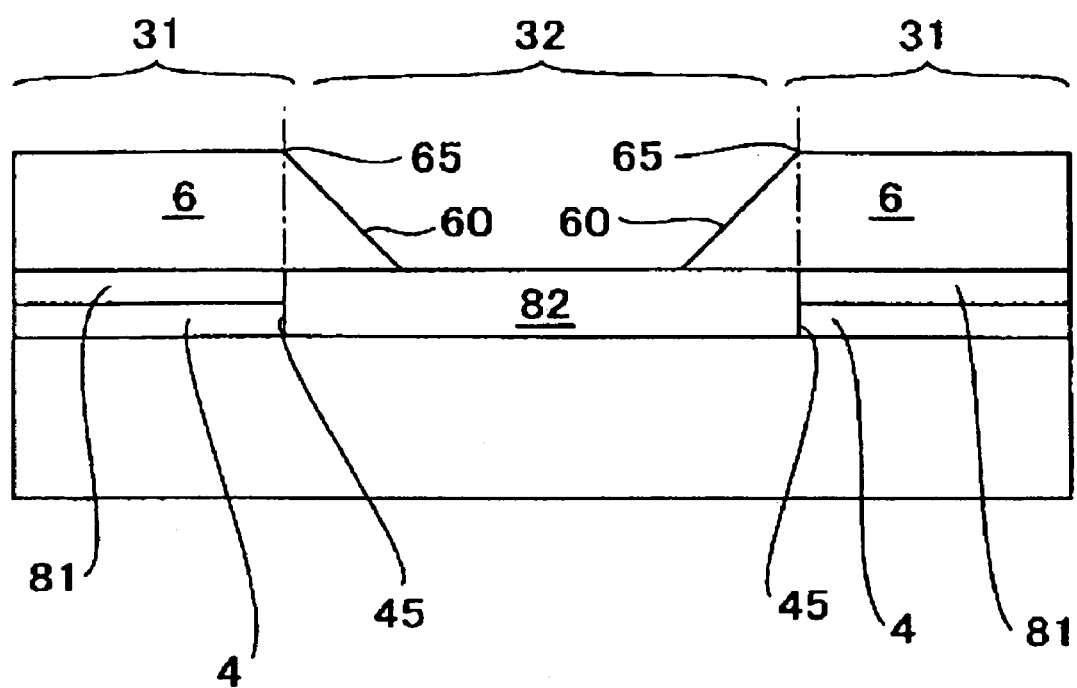
FIG. 2 is a schematic illustration showing the physical relationship between a light-reflecting layer and a thickness-adjusting layer of the liquid crystal device shown in FIG. 1.

(A), (B) and (C) of FIG. 1 are a schematic plan view of one of a plurality of pixel regions formed in a matrix of a liquid crystal device in (A), a sectional view taken along line A–A' in (B), and a sectional view taken along line B–B' in (C), respectively. FIG. 2 is a schematic illustration showing the physical relationship between a light-reflecting layer and a thickness-adjusting layer of the liquid crystal device. Since the fundamental structure of the liquid crystal device of the present invention is the same as the known liquid crystal device, parts having the same function are designated by the same reference numerals.

The pixel region in FIG. 1(A), (B), and (C) shows a part common to the below-mentioned active matrix liquid crystal devices using TFTs or TFDs as non-linear elements for switching pixels. A liquid crystal device 1 shown here comprises a transparent first substrate 10 formed of quartz or glass and having a first transparent electrode 11 formed of ITO or the like on the surface thereof, a transparent second substrate 20 formed of quartz or glass and having a second transparent electrode 21 formed of ITO or the like so as to oppose the first electrode 11, and a liquid crystal layer 50 held between the first substrate 10 and the second substrate 20 and formed of TN liquid crystal. The region between the first transparent electrode 11 and the second transparent electrode 21 defines a pixel region 3, which directly contributes to displaying images.

The first transparent electrode 11 of the first substrate 10 is provided with an alignment layer 12 on the surface thereof, and the second transparent electrode 21 of the second substrate 20 is also provided with an alignment layer 22 on the surface thereof. The alignment layers 12 and 22 are formed by applying and baking a polyimide film and, subsequently, by rubbing the film in a predetermined direction. By being subjected to this rubbing process, the alignment layers 12 and 22 allow the liquid crystal molecules of the liquid crystal layer 50 to align at a twist angle of 90° or less. Thus, the downward direction (the six o'clock direction) of the pixel region 3 defined by four sides in the drawing is the clear viewing direction.

The liquid crystal device 1 has many pixel regions 3 in a matrix. The boundaries of the pixel regions 3, in plan view, are provided with a shading film 9, referred to as a black mask or black stripes, on the second substrate 20 or with shading wires (not shown in the drawing) on the first substrate 10. Hence, each pixel region 3 is surrounded by the shading film 9 or the shading wires.

The first substrate 10 has a rectangular light-reflecting layer 4 (indicated by oblique lines sloping down to right in FIG. 1(A)) formed of an aluminum film or a silver alloy film. The light-reflecting layer 4 defines a reflective display region 31 in the rectangular pixel region 3 between the first transparent electrode 11 and the second transparent electrode 21 and has a rectangular opening 40. Thus, in the pixel region 3, while the region provided with the light-reflecting layer 4 defines the reflective display region 31, the region corresponding to the opening 40 defines a rectangular transmissive display region 32, where the light-reflecting layer 4 is not formed. One side 33 of the four sides of the transmissive display region 32 is positioned in the clear viewing direction (the six o'clock direction) and overlaps with a side 34 of the pixel region 3.

The side 33 positioned in the clear viewing direction of the transmissive display region 32 is adjacent to another reflective display region 31a of an adjacent pixel region.

The first substrate 10 and the second substrate 20 have polarizers 41 and 42, respectively, on the outer surfaces thereof, and a backlight device 7 opposes the polarizer 41.

In the liquid crystal device 1 having the structure described above, light emitted from the backlight device 7 to enter the transmissive display region 32 enters the liquid crystal layer 50 through the first substrate 10 and is modulated in the liquid crystal layer 50. Then, the light is emitted from the second substrate 20 to serve as transmissive display light to display images (transmissive mode), as indicated by Arrow L1.

Light entering the reflective display region 31 through the second substrate 20 reaches the reflecting layer 4 through the liquid crystal layer 50. The light is reflected at the reflecting layer 4 and is emitted from the second substrate 20 through the liquid crystal layer 50 to serve as reflective display light to display images (reflective mode), as indicated by Arrow L2.

In the first substrate 10, the reflective display region 31 and the transmissive display region 32 are provided with a reflective-display color filter 81 and a transmissive-display color filter 82, respectively, so that color images can be displayed. The transmissive-display color-filter 82 contains, for example, a large amount of pigment, and it is, thus, colored more strongly than the reflective-display color filter 81. The edges of the reflective-display color filter 81 are aligned with the edges of the reflecting layer 4.

In this transflective liquid crystal device 1, while the transmissive display light passes through the liquid crystal layer 50 only once, the reflective display light passes through the liquid crystal layer 50 twice. In the first substrate 10, accordingly, a thickness-adjusting layer 6 is formed of a photosensitive resin under the first transparent electrode 11 and above the light-reflecting layer 4. The thickness-adjusting layer 6 has the opening 61 formed in the region corresponding to the transmissive display region 32. Since the thickness d of the liquid crystal layer 50 in the transmissive display region 32 is larger than that in the reflective display region 31 by the thickness of the thickness-adjusting layer 6, the retardations $\Delta n \cdot d$ of both the transmissive display light and the reflective display light can be optimized.

The thickness-adjusting layer 6 is formed by photolithography. However, the thickness-adjusting layer 6 has slopes 60 diverging upward between the reflective display region 31 and the transmissive display region 32 because of the low exposure accuracy and side etching caused by development during the photolithography. The slopes 60 have a width of 8 μm in plan view. As a result, the thickness d of the liquid crystal layer 50 changes continuously at the boundary between the reflective display region 31 and the transmissive display region 32, and the retardation $\Delta n \cdot d$ continuously changes accordingly. Also, the initial orientation of liquid crystal molecules contained in the liquid crystal layer 50 is determined by alignment layers 12 and 22 formed on the surfaces of the first substrate 10 and the second substrate 20. However, since the alignment strength of the alignment layer 12 acts in tilted directions in the slopes 60, the orientation of the liquid crystal molecules is disordered in these areas.

Such unstable boundaries degrade the quality of the displayed images. Accordingly, this embodiment is intended to improve the quality of images displayed in a reflective display mode. As shown magnified in FIG. 2, at the boundary between the reflective display region 31 and the transmissive display region 32, the edges 45 of the light-reflecting layer 4 are aligned with the top edges 65 of the slopes 60 formed at ends of the thickness-adjusting layer 6 when viewed from above.

Figure 26:
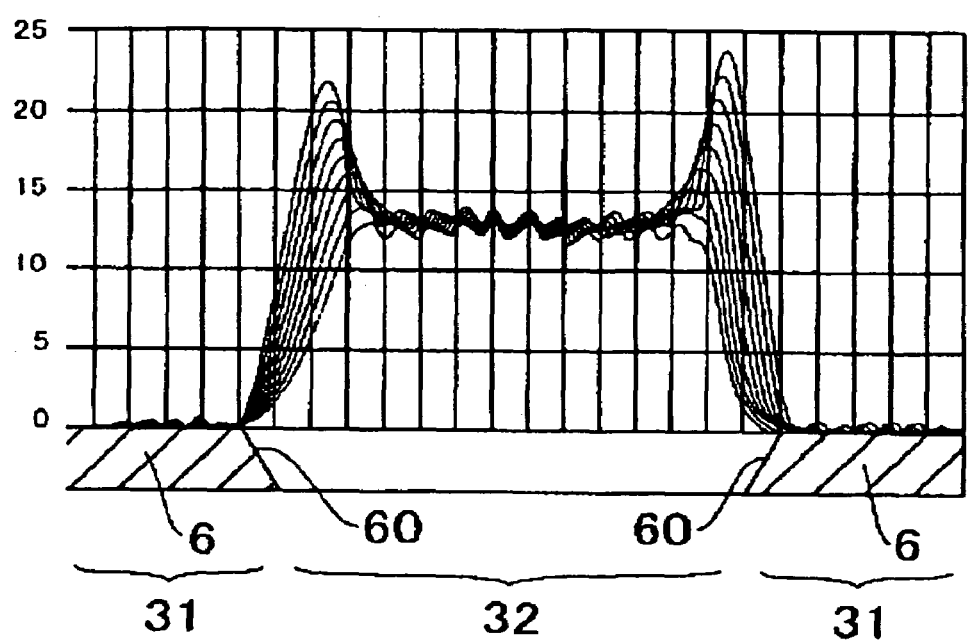
FIGS. 26(A) and (B) are a graph showing a result of a simulation for estimating the distribution of the reflected light intensity for each rubbing direction from a reflective display region to a transmissive display region of a known transflective liquid crystal device when images are displayed black and a graph showing a result of a simulation for estimating the distribution of the transmitted light intensity for each rubbing direction from a reflective display region to the transmissive display region when images are displayed black, respectively
Figure 26:
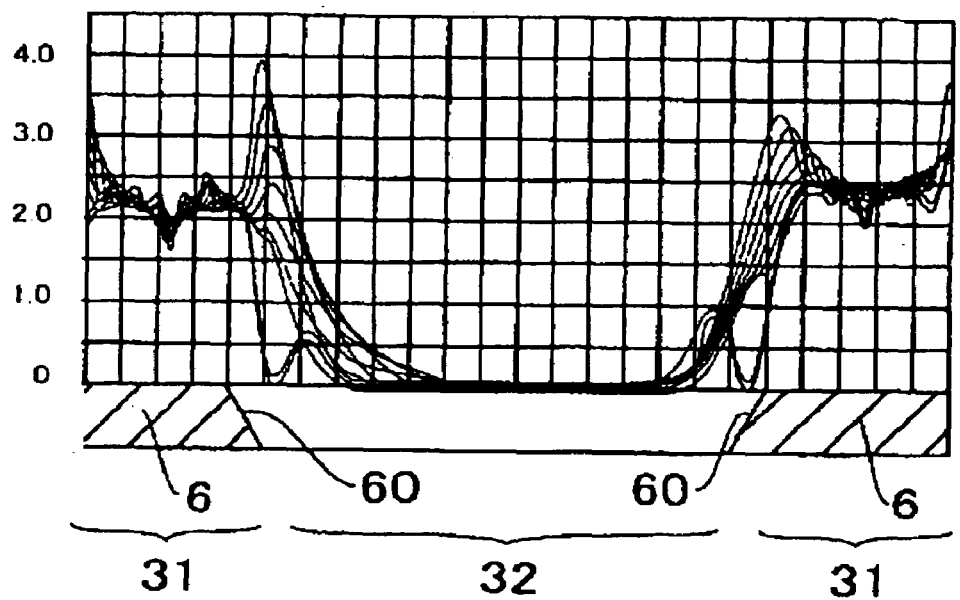

Hence, at the boundary between the reflective display region 31 and the transmissive display region 32 of the embodiment, the light-reflecting layer 4 is not formed in the region overlapping with the slopes 60 formed at the ends of the thickness-adjusting layer 6. As a result, reflected light does not travel through the boundary between the reflective display region 31 and the transmissive display region 32 (the region where the thickness-adjusting layer 6 forms the slopes 60 at the ends thereof). Transmitted light enters the boundary between the reflective display region 31 and the transmissive display region 32 (the region where the thickness-adjusting layer 6 forms the slopes 60 at the ends thereof); however, the leakage level of the transmitted light is notably lower than that of the reflected light, as described above with reference to FIG. 26(B). Therefore, even if the retardation $\Delta n \cdot d$ continuously changes according to the continual change in the thickness of the thickness-adjusting layer 6 at the boundary between the reflective display region 31 and the transmissive display region 32, and even if the orientation of the liquid crystal molecules is not aligned, reflected light does not travel through these regions in a reflective mode. Thus, high-contrast high-quality images can be displayed.

Also, since the amount of display light does not decrease as compared to when the entire boundary between the reflective display region 31 and the transmissive display region 32 are covered with the shading film, bright images can be displayed.

The one side 33 of the four sides of the transmissive display region 32 is positioned in the clear viewing direction (the six o'clock direction) and overlaps with the side 34 of the corresponding pixel region, thus overlapping the shading film 9 when viewed from above. As a result, although the clear viewing direction side of the sides defining the transmissive display region 32 tends to cause light leakage, the light which would otherwise leak through the clear viewing direction side is blocked with the shading film 9 and is, consequently, not emitted. Thus, high-contrast high-quality images can be displayed.

In addition, since the side 33 positioned in the clear viewing direction of the transmissive display regions 32 is adjacent to a reflective display region 31a of an adjacent pixel region, the light which would otherwise leak through the boundary between the transmissive display region 32 and the adjacent reflective display region 31a (the region where the thickness-adjusting layer 6 forms one of the slopes 60 at an end thereof) is blocked with the shading film 9. Therefore, even if the retardation $\Delta n \cdot d$ continuously changes in the regions where the thickness-adjusting layer 6 forms the slopes 60, and even if the orientation of the liquid crystal molecules is not aligned, the light which would otherwise leak through these regions is blocked with the shading film 9. Thus, the contrast and the quality of images can be improved.

Also, since the transmissive-display color filter 82 is colored more strongly than the reflective-display color filter 81, transmitted light can be colored as strongly as reflected light which passes through the reflective-display color filter twice and high-quality color images can be displayed, even though the transmitted display light passes through the transmissive-display color filter only once.

When the liquid crystal device 1 is manufactured, the first substrate 10 having such a structure is processed as follows.

First, the first substrate 10 formed of quartz or glass is prepared, and then a reflective metallic layer, such as an aluminum layer or a silver alloy layer, is formed on the entire surface of the first substrate 10. The metallic layer is patterned by photolithography to form the light-reflecting layer 4.

Next, the reflective-display color filter 81 and the transmissive-display color filter 82 are formed in predetermined regions by flexography, photolithography, or an ink jet method.

Next, a photosensitive resin is applied to the entire surface of the first substrate 10 by spin coating, and is subsequently subjected to light exposure and development to form the thickness-adjusting layer 6.

Next, a transparent conductive layer is formed of ITO or the like on the entire surface of the first substrate 10, and then the transparent conductive layer is patterned to form the first transparent electrode 11 by photolithography.

Next, a polyimide resin is applied to the entire surface of the first substrate 10 by spin coating, and is subsequently baked. Then, the. polyimide resin is subjected to alignment treatment, such as rubbing, to form the alignment layer 12.

The resulting first substrate 10 is bonded to the second substrate 20, which has been formed separately, with a predetermined gap therebetween. Then, liquid crystal is injected into the gap to form the liquid crystal layer 50.

Since the liquid crystal device 1 may have non-linear elements for switching pixels, such as TFDs or TFTs, on the first substrate 10, the shading film 9 for the boundary and other layers may be formed using part of the process for forming the TFDs or the TFTs.

Embodiment 2

Figure 3A:
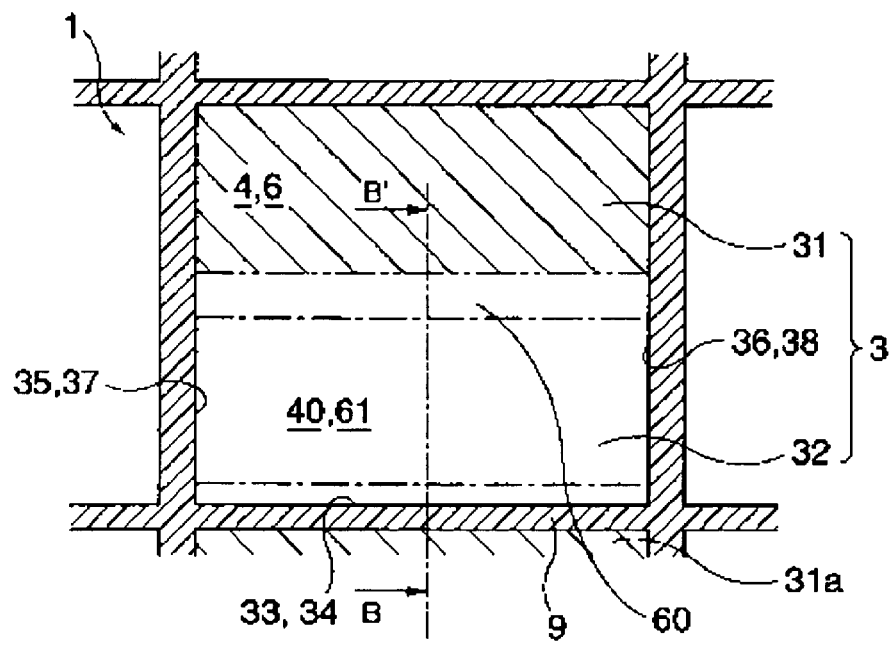
FIGS. 3(A) and (B) are a schematic plan view of one of a plurality of pixel regions formed in a matrix of a transflective liquid crystal device according to Embodiment 2 of the present invention in (A) and a sectional view taken along line B–B' in (B), respectively.
Figure 3B:
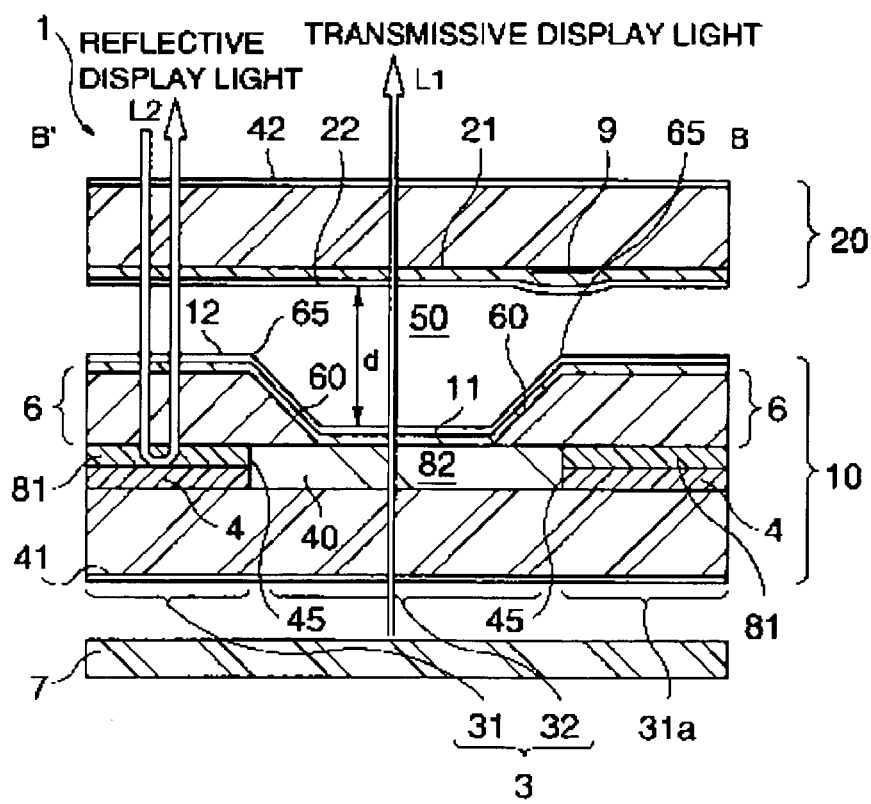

(A) and (B) of FIG. 3 are a schematic plan view of one of a plurality of pixel regions formed in a matrix of a liquid crystal device in (A), and a sectional view taken along line B–B' in (B), respectively. Since the fundamental structure of the liquid crystal device of this embodiment is the same as Embodiment 1, parts having the same function are designated by the same reference numerals and the description for these parts is not repeated. Also, the manufacturing method is the same as in Embodiment 1 and the description is not repeated.

The pixel region in FIG. 3(A) and (B) shows a part common to the below-mentioned active matrix liquid crystal devices using TFTs or TFDs as non-linear elements for switching pixels, as in Embodiment 1. A liquid crystal device 1 shown here, also, comprises a transparent first substrate 10 having a first transparent electrode 11 on the surface thereof, a second substrate 20 having a second transparent electrode 21 opposing the first electrode 11, and a liquid crystal layer 50 held between the first substrate 10 and the second substrate 20 and formed of TN liquid crystal. The region between the first transparent electrode 11 and the second transparent electrode 21 defines a pixel region 3, which directly contributes to displaying images.

The first transparent electrode 11 of the first substrate 10 is provided with an alignment layer 12 on the surface thereof, and the second transparent electrode 21 of the second substrate 20 is also provided with an alignment layer 22 on the surface thereof. The alignment layers 12 and 22 are formed by applying and baking a polyimide film and, subsequently, by rubbing the film in a predetermined direction. By being subjected to this rubbing process, the alignment layers 12 and 22 allow the liquid crystal molecules of the liquid crystal layer 50 to align at a twist angle of 90° or less. Thus, the downward direction (the six o'clock direction) of the pixel region 3 defined by four sides in the drawing is the clear viewing direction.

The liquid crystal device 1 has many pixel regions 3 in a matrix. The boundaries of the pixel regions 3 are provided with a shading film 9, referred to as the black mask or the black stripe, on the second substrate 20 or with shading wires (not shown in the drawing) in the first substrate 10 in plan view. Hence, each pixel region 3 is surrounded by the shading film 9 or the light-shielding wires in plan view.

The first substrate 10 has a rectangular light-reflecting layer 4 (indicated by oblique lines sloping down to right in FIG. 3(A)) formed of an aluminum film or a silver alloy film. The light-reflecting layer 4 defines a reflective display region 31 in the rectangular pixel region 3 between the first transparent electrode 11 and the second transparent electrode 21 and has a rectangular opening 40. Thus, in the pixel region 3, while the region provided with the light-reflecting layer 4 defines the reflective display region 31, the region corresponding to the opening 40 defines a rectangular transmissive display region 32, where the light-reflecting layer 4 is not formed. One side 33 of the four sides of the transmissive display region 32 is positioned in the clear viewing direction (the six o'clock direction) and overlaps with a side 34 of the pixel region. Sides 35 and 36 of the four sides of the transmissive display region 32, adjoining the side 33 positioned in the clear viewing direction (the six o'clock direction), overlap with sides 37 and 38 of the pixel region 3, respectively.

The side 33 positioned in the clear viewing direction of the transmissive display region 32 is adjacent to another reflective display region 31 a of an adjacent pixel region.

The first substrate 10 and the second substrate 20 have polarizers 41 and 42, respectively, on the outer surfaces thereof and a backlight device 7 opposes the polarizer 41.

In the liquid crystal device 1 having such a structure, light emitted from the backlight device 7 to enter the transmissive display region 32 enters the liquid-crystal layer 50 through the first substrate 10 and is modulated in the liquid crystal layer 50. Then, the light is emitted from the second substrate 20 to serve as transmissive display light to display images (transmissive mode), as indicated by Arrow L1.

Light entering through the second substrate 20 to the reflective display region 31 reaches the reflecting layer 4 through the liquid crystal layer 50. The light is reflected at the reflecting layer 4 and emitted from the second substrate 20 through the liquid crystal layer 50 to serve as reflective display light to display images (reflective mode), as indicated by Arrow L2.

In the first substrate 10, the reflective display region 31 and the transmissive display region 32 are provided with a reflective-display color filter 81 and a transmissive-display color filter 82, respectively, so that color images can be displayed. The transmissive-display color filter 82 contains, for example, a large amount of pigment, and is thus colored more strongly than the reflective-display color filter 81. The edges of the reflective-display color filter 81 are aligned with the edges of the light-reflecting layer 4 in plan view.

In this transflective liquid crystal device 1, while the transmissive display light passes through the liquid crystal layer 50 only once, the reflective display light passes through the liquid crystal layer 50 twice. In the first substrate 10, accordingly, a thickness-adjusting layer 6 is formed of a photosensitive resin under the first transparent electrode 11 and above the light-reflecting layer 4. The thickness-adjusting layer 6 has the opening 61 formed in the region corresponding to the transmissive display region 32. Since the thickness d of the liquid crystal layer 50 in the transmissive display region 32 is larger than that in the reflective display region 31 by the thickness of the thickness-adjusting layer 6, the retardations Δn·d of both the transmissive display light and the reflective display light can be optimized.

The thickness-adjusting layer 6 is formed by photolithography. However, the thickness-adjusting layer 6 has slopes 60 diverging upward between the reflective display region 31 and the transmissive display region 32 because of the low exposure accuracy and side etching caused by development during the photolithography. The slopes 60 have a width of 8 μm in plan view. As a result, the thickness d of the liquid crystal layer 50 changes continuously at the boundary between the reflective display region 31 and the transmissive display region 32, and the retardation Δn·d continuously changes accordingly. Also, the initial orientation of liquid crystal molecules contained in the liquid crystal layer 50 is determined by alignment layers 12 and 22 formed on the surface of the first substrate 10 and the second substrate 20. However, since the alignment strength of the alignment layer 12 acts in tilted directions in the slopes 60, the orientation of the liquid crystal molecules is not aligned.

Such an unstable boundary degrades the quality of displayed images. Accordingly, this embodiment is intended to improve the quality of images displayed in a reflective display mode. As shown magnified in FIG. 2, at the boundary between the reflective display region 31 and the transmissive display region 32, the edges 45 of the light-reflecting layer 4 are aligned with the top edges 65 of the slopes 60 formed at ends of the thickness-adjusting layer 6 in plan view.

Hence, at the boundary between the reflective display region 31 and the transmissive display region 32 of the embodiment, the light-reflecting layer 4 is not formed in the region overlapping with the slopes 60 formed at the ends of the thickness-adjusting layer 6, in plan view. As a result, reflected light does not enter the boundary between the reflective display region 31 and the transmissive display region 32 (the region where the thickness-adjusting layer 6 forms the slopes 60 at the ends thereof). Transmitted light enters through the boundary between the reflective display region 31 and the transmissive display region 32 (the region where the thickness-adjusting layer 6 forms the slopes 60 at the ends thereof); however, the leakage level of the transmitted light is notably lower than that of the reflected light, as described above with reference to FIG. 26(B). Therefore, even if the retardation Δn·d continuously changes according to the continual change in the thickness of the thickness-adjusting layer 6 at the boundary between the reflective display region 31 and the transmissive display region 32, and even if the orientation of the liquid crystal molecules is not aligned, reflected light does not travel through these regions in a reflective mode. Thus, high-contrast high-quality images can be displayed.

Also, since the amount of display light does not decrease in comparison with when the entire boundary between the reflective display region 31 and the transmissive display region 32 is covered with the shading film, the liquid crystal device of this embodiment can produce the same effect as in Embodiment 1 and, thus, bright images can be displayed.

The one side 33 of the four sides defining the transmissive displaying region 32 is positioned in the clear viewing direction (the six o'clock direction) and overlaps with the side 34 of the pixel region which overlaps with the shading film 9 in plan view. As a result, although the clear viewing direction side of the sides of the transmissive display region 32 tends to cause light leakage, the light which would otherwise leak through the clear viewing direction side is blocked with the shading film 9 and is consequently not emitted. Thus, high-contrast high-quality images can be displayed.

The sides 35 and 36 of the four sides defining the transmissive displaying region 32 also overlap with the sides 37 and 38 of the pixel region 3, thus overlapping with the shading film 9 when viewed from above. Therefore, the light which would otherwise leak from the region corresponding to the sides 35 and 36 of the transmissive display region 32 is blocked with the shading film 9, and is consequently not emitted. Thus, high-contrast high-quality images can be displayed.

In addition, since the side 33 positioned in the clear viewing direction of the transmissive display regions 32 is adjacent to a reflective display region 31a of an adjacent pixel region, the light which would otherwise leak through the boundary between the transmissive display region 32 and the adjacent reflective display region 31a (the region where the thickness-adjusting layer 6 forms one of the slopes 60 at an end thereof) is blocked with the shading film 9. Therefore, even if the retardation Δn·d continuously changes in the regions where the thickness-adjusting layer 6 forms the slopes 60, and even if the orientation of the liquid crystal molecules is not aligned, the light which would otherwise leak through these regions is blocked with the shading film 9. Thus, the contrast and the quality of images can be improved.

Embodiment 3

Figure 4A:
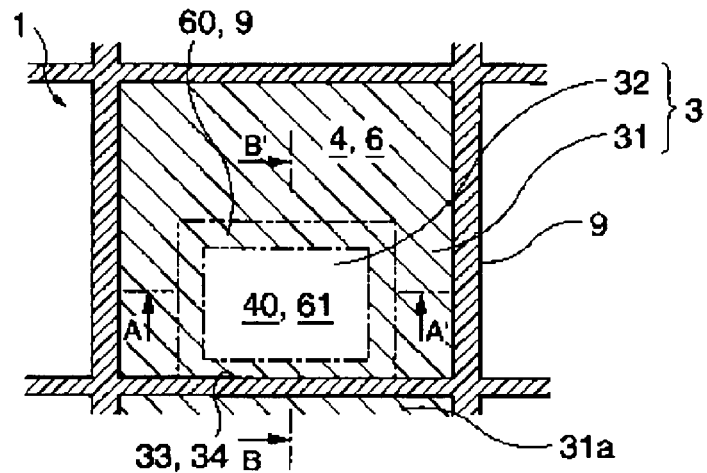
FIGS. 4(A), (B) and (C) are a schematic plan view of one of a plurality of pixel regions formed in a matrix of a transflective liquid crystal device according to Embodiment 3 of the present invention in (A), a sectional view taken along line A–A' in (B), and a sectional view taken along line B–B' in (C), respectively.
Figure 4B:
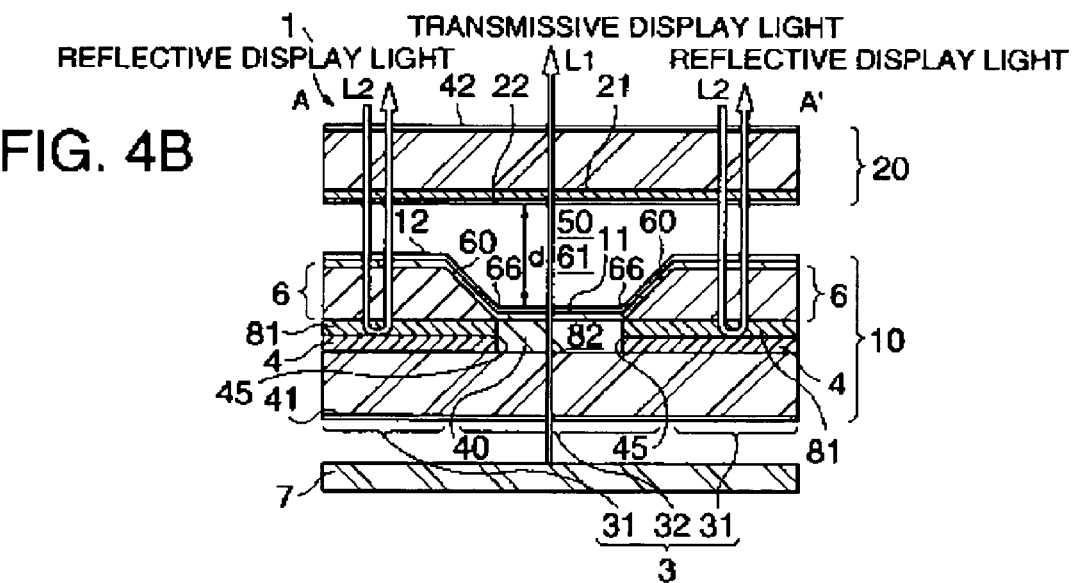
Figure 4C:
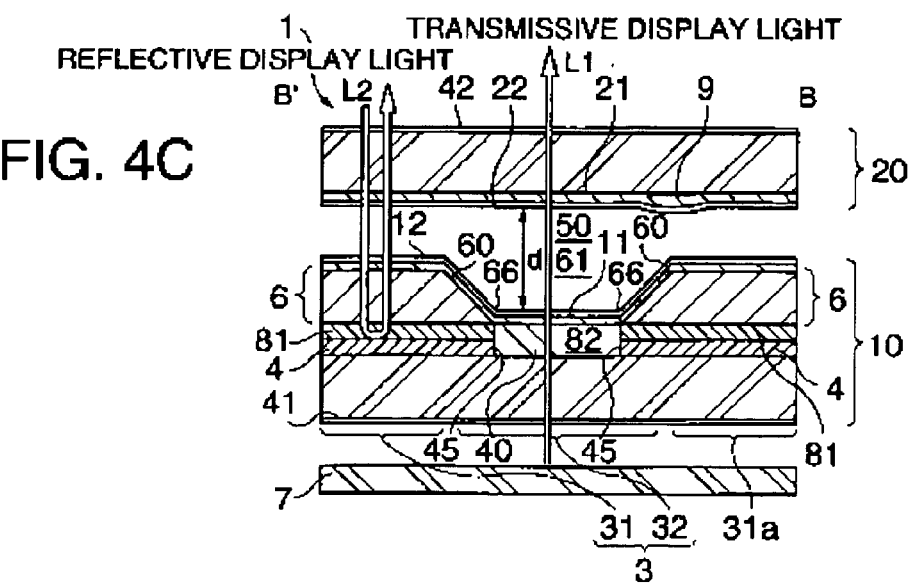
Figure 5:
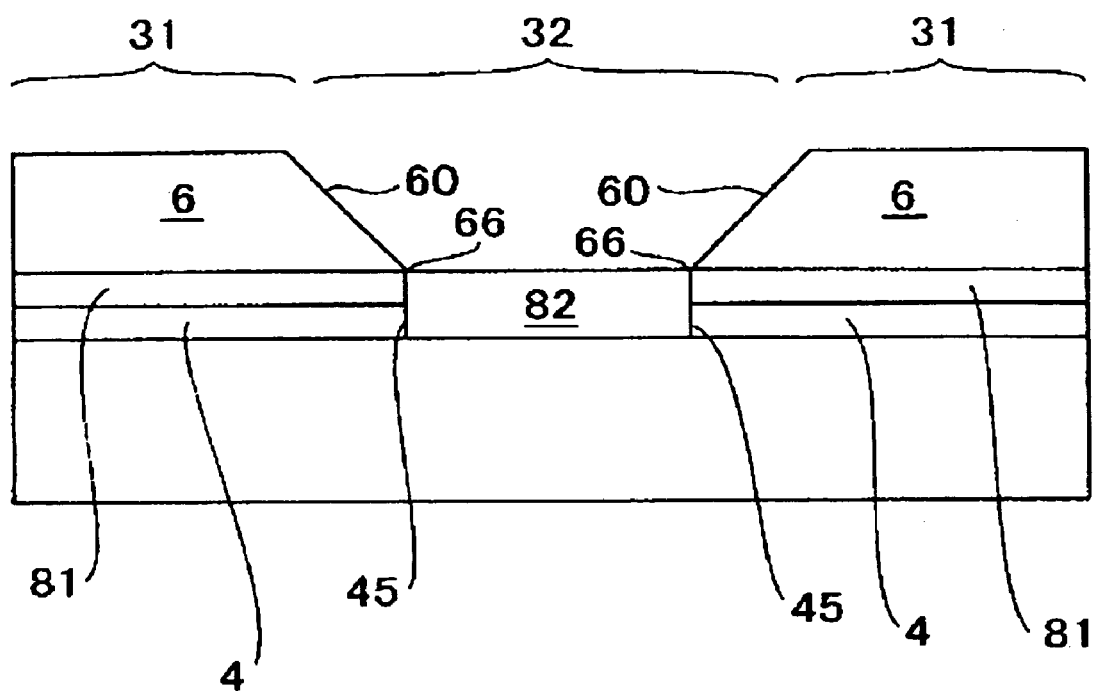
FIG. 5 is a schematic illustration showing the physical relationship between a light-reflecting layer and a thickness-adjusting layer of the liquid crystal device shown in FIG. 4.

(A), (B) and (C) of FIG. 4 are a schematic plan view of one of a plurality of pixel regions formed in a matrix of a liquid crystal device in (A), a sectional view taken along line A–A' in (B), and a sectional view taken along line B–B' in (C), respectively. FIG. 5 is a schematic illustration showing the physical relationship between a light-reflecting layer and a thickness-adjusting layer of the liquid crystal device.

Embodiments 1 and 2 described above are characterized in that the reflected light is prevented from leaking. On the other hand, this embodiment and the following Embodiment 4 are characterized in that the transmitted light is prevented from leaking, but the other components in the structure are the same. Therefore parts having the same function are designated by the same reference numerals and the description for these parts is not repeated.

The embodiment shown in (A), (B) and (C) of FIG. 4 and FIG. 5 is intended to improve the quality of images displayed in a transmissive display mode. At the boundary between the reflective display region 31 and the transmissive display region 32, the edges 45 of the light-reflecting layer 4 are aligned with the bottom edges 66 of the slopes 60 formed at ends of the thickness-adjusting layer 6. The edges of the reflective-display color filter 81 are aligned with the edges of the light-reflecting layer 4 in plan view.

Hence, in this embodiment, the light-reflecting layer 4 overlaps with the slopes 60 formed at the ends of the thickness-adjusting layer 6 when viewed from above, at the boundary between the reflective display region 31 and the transmissive display region 32. As a result, transmitted light does not enter the boundary between the reflective display region 31 and the transmissive display region 32 (the region where the thickness-adjusting layer 6 forms the slopes 60 at the ends thereof).

Therefore, even if the retardation $\Delta n \cdot d$ continuously changes according to the continual change in the thickness-adjusting layer 6 at the boundary between the reflective display region 31 and the transmissive display region 32, and even if the orientation of the liquid crystal molecules is not aligned, the transmitted light does not travel through such a region in a transmissive mode. Thus, high-contrast high-quality images can be displayed. Also, since the amount of display light does not decrease as compared to when the entire boundary between the reflective display region 31 and the transmissive display region 32 is covered with the shading film, bright images can be displayed.

The one side 33 of the four sides defining the transmissive display region 32 is positioned in the clear viewing direction (the six o'clock direction) and overlaps with the side 34 of the pixel region, thus overlapping with the shading film 9 when viewed from above. As a result, although the clear viewing direction side of the sides defining the transmissive display region 32 tends to cause light leakage, the light which would otherwise leak through the clear viewing direction side is blocked with the shading film 9 and is, consequently, not emitted. Thus, high-contrast high-quality images can be displayed.

In addition, since the side 33 positioned in the clear viewing direction of the transmissive display region 32 is adjacent to a reflective display region 31a of an adjacent pixel region, the light which would otherwise leak through the boundary between the transmissive display region 32 and the adjacent reflective display region 31a (the region where the thickness-adjusting layer 6 forms one of the slopes 60 at an end thereof) is blocked with the shading film 9. Therefore, even if the retardation $\Delta n \cdot d$ continuously changes in the regions where the thickness-adjusting layer 6 forms the slopes 60 at the ends thereof, and even if the orientation of the liquid crystal molecules is not aligned, the light which would otherwise leak through these regions is blocked with the shading film 9. Thus, the contrast and the quality of images can be improved.

Embodiment 4

Figure 6A:
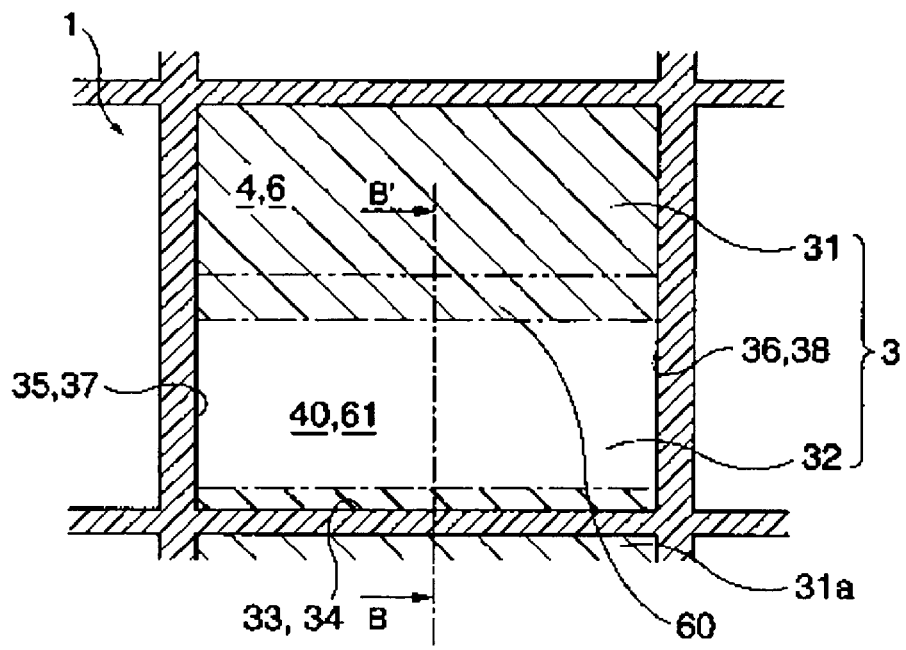
FIGS. 6(A) and (B) are a schematic plan view of one of a plurality of pixel regions formed in a matrix of a transflective liquid crystal device according to Embodiment 4 of the present invention in (A) and a sectional view taken along line B–B' in (B), respectively.
Figure 6B:
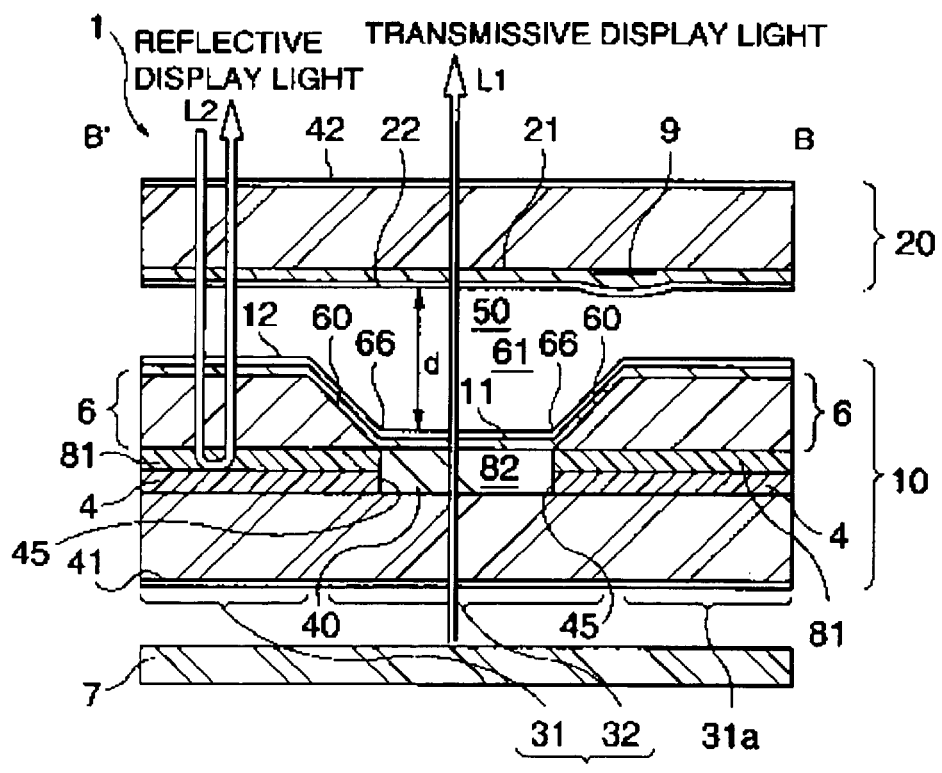

(A) and (B) of FIG. 6 are a schematic plan view of one of a plurality of pixel regions formed in a matrix of a liquid crystal device in (A) and a sectional view taken along line B–B' in (B), respectively.

This embodiment shown in (A) and (B) of FIG. 6 and FIG. 5 is also intended to improve the quality of images displayed in a transmissive display mode, as in Embodiment 3. At the boundary between the reflective display region 31 and the transmissive display region 32, the edges 45 of the light-reflecting layer 4 are aligned with the bottom edges 66 of the slopes 60 formed at ends of the thickness-adjusting layer 6. The edges of the reflective-display color filter 81 are aligned with the edges of the light-reflecting layer 4 in plan view.

Hence, in this embodiment, the light-reflecting layer 4 overlaps with the slopes 60 formed at the ends of the thickness-adjusting layer 6 when viewed from above, at the boundary between the reflective display region 31 and the transmissive display region 32. As a result, transmitted light does not enter the boundary between the reflective display region 31 and the transmissive display region 32 (the region where the thickness-adjusting layer 6 forms the slopes 60 at the ends thereof).

Therefore, even if the retardation $\Delta n \cdot d$ continuously changes according to the continual change in the thickness of the thickness-adjusting layer 6 at the boundary between the reflective display region 31 and the transmissive display region 32, and even if the orientation of the liquid crystal molecules is not aligned, the transmitted light does not travel through such a region in a transmissive mode. Thus, high-contrast high-quality images can be displayed. Also, since the amount of display light does not decrease in comparison with when the entire boundary between the reflective display region 31 and the transmissive display region 32 is covered with the shading film, bright images can be displayed.

The one side 33 of the four sides defining the transmissive display region 32 is positioned in the clear viewing direction (the six o'clock direction) and overlaps with the side 34, of the pixel region 3, thus overlapping with the shading film 9 when viewed form above. As a result, although the clear viewing direction side of the sides defining the transmissive display region 32 tends to cause light leakage, the light which would otherwise leak through the clear viewing direction side is blocked with the shading film 9 and is consequently not emitted. Thus, high-contrast high-quality images can be displayed.

In addition, the side 33 positioned in the clear viewing direction of the transmissive display region 32 is adjacent to a reflective display region 31a of an adjacent pixel region, the light which would otherwise leak through the boundary between the transmissive display region 32 and the adjacent reflective display region 31a (the region where the thickness-adjusting layer 6 forms one of the slopes 60 at an end thereof) is blocked with the shading film 9. Therefore, even if the retardation $\Delta n \cdot d$ continuously changes in the regions where the thickness-adjusting layer 6 forms the slopes 60, and even if the orientation of the liquid crystal molecules is not aligned, the light which would otherwise leak through these regions is blocked with the shading film 9. Thus, the contrast and the quality of images can be improved.

The sides 35 and 36 of the four sides defining the transmissive display region 32 also overlap with the sides 37 and 38 of the pixel region 3, thus overlapping with the shading film 9 when viewed from above. Therefore, the light which would otherwise leak from the region corresponding to the sides 35 and 36 of the transmissive display region 32 is blocked with the shading film 9, and is consequently not emitted. Thus, high-contrast high-quality images can be displayed.

Embodiment 5

Figure 7A:
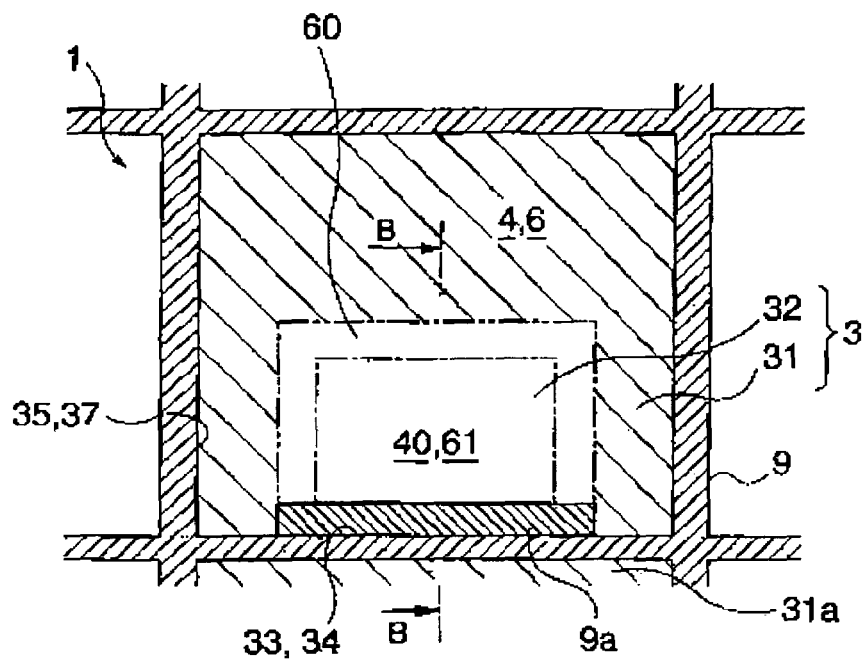
FIGS. 7(A) and (B) are a schematic plan view of one of a plurality of pixel regions formed in a matrix of a transflective liquid crystal device according to Embodiment 5 of the present invention in (A) and a sectional view taken along line B–B' in (B), respectively.
Figure 7B:
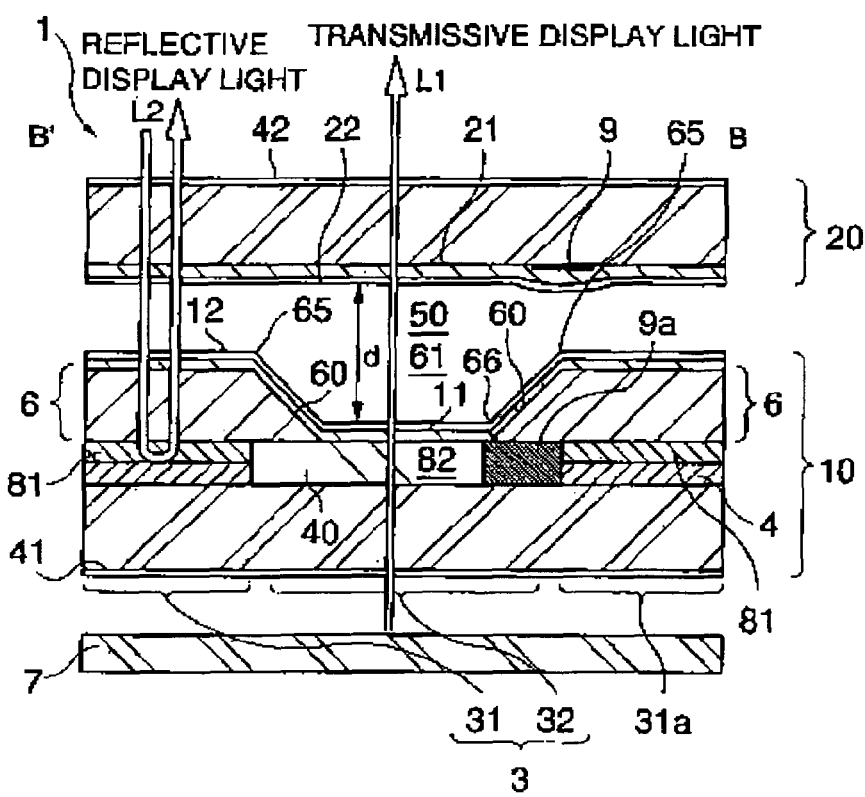

FIG. 7 shows a modification of Embodiment 1 shown in FIG. 1. (A) and (B) of FIG. 7. are a schematic plan view of one of a plurality of pixel regions formed in a matrix of a liquid crystal device in (A) and a sectional view taken along line B–B' in (B), respectively. In the liquid crystal device of this embodiment, the same parts as in Embodiment 1 are designated by the same reference numerals and the description is not repeated.

The embodiment is different from Embodiment 1 in that a shading film 9a is provided between the reflective-display color filter 81 and the transmissive-display color filter 82 at the boundary between the transmissive display region 32 and the reflective display region 31a of an adjacent pixel region. The boundary between the shading film 9a and the transmissive-display color filter 82 is substantially aligned with the bottom edge 66 of one of the slopes 60 formed at the ends of the thickness-adjusting layer 6 in plan view, and the boundary between the shading film 9a and the reflective-display color filter 81 and the boundary between the light-reflecting layer 4 and the shading film 9a is substantially aligned with the top edge 65 of the slope 60 in plan view.

The shading film 9a is formed by applying, for example, an acrylic resin containing carbon black with a spin coater and, subsequently, by patterning the acrylic resin.

This structure produces the same effect as in Embodiment 1. In addition, since the region where the thickness-adjusting layer 6 forms the slopes 60 at the ends thereof overlaps, in plan view, with the shading layer 9a disposed between the reflective-display color filter 81 and the transmissive-display color filter 82 particularly at the boundary between the transmissive display region 32 and the reflective display region 31a of an adjacent pixel region, light does not leak from this boundary region. Also, this boundary region originally defines the boundary between the adjacent two pixel regions which is expected to have a shading film or wires. Therefore the decrease in the amount of display light due to the shading film 9a provided between the reflective-display color filter 81 and the transmissive-display color filter 82 less occurs. The shading layer 9a blocks light which would otherwise leak through the slopes 60 of the thickness-adjusting layer 6 effectively, thereby improving the contrast and the quality of displayed images.

Although description is omitted, in Embodiment 2 described above, the same shading film 9a as used in this embodiment may also be provided between the reflective-display color filter 81 and the transmissive-display color filter 82 at the boundary between the transmissive display region 32 and the reflective display region 31a of an adjacent pixel region.

Embodiment 6

Figure 8:
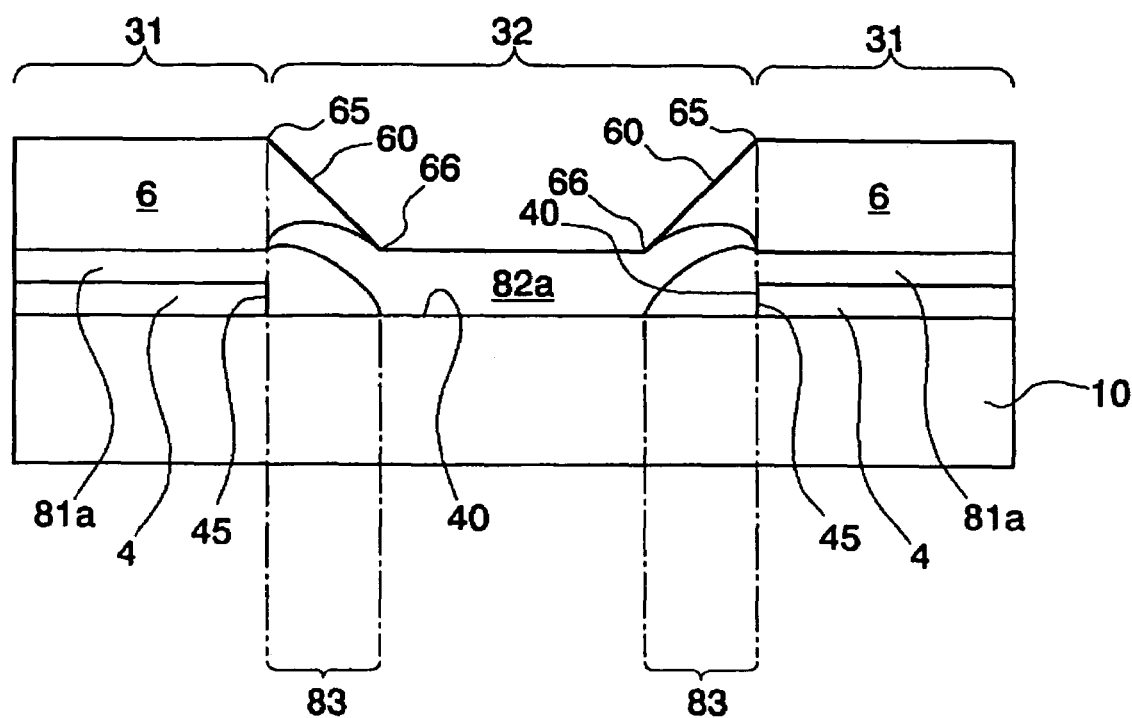
FIG. 8 is a schematic illustration showing the physical relationship between layers on a lower substrate of a liquid crystal device of Embodiment 6.

FIG. 8 is a schematic illustration showing the physical relationship between layers on a lower substrate of a liquid crystal device of Embodiment 6. Embodiment 6 is different from Embodiment 1 in that the ends of the reflective-display color filter 81a and the ends of the transmissive-display color filter 82a overlap each other to form an overlap 83 in the region where the slopes 60 are formed at the ends of the thickness-adjusting layer 6. In the liquid crystal device of this embodiment, the same parts as in Embodiment 1 are designated by the same reference numerals and the description is not repeated.

In this embodiment, a light-reflecting layer 4 is formed of aluminum or a silver alloy on the first substrate 10 and the light-reflecting layer 4 has a rectangular opening 40.

Thus, in each pixel region, while the region provided with the light-reflecting layer 4 defines a reflective display region 31, the region corresponding to the opening 40 defines a rectangular transmissive display region 32, where the light-reflecting layer 4 is not formed. The edges of the light-reflecting layer 4 are substantially aligned with the top edges 65 of the slops 60 formed at the ends of the thickness-adjusting layer 6.

A reflective-display color filter 81a is formed on the light-reflecting layer 4, and the edges of the reflective-display color filter 81a are substantially aligned with the bottom edges 66 of the slopes 60 formed at the ends of the thickness adjusting layer 6.

On the other hand, a transmissive-display color filter 82a is formed in the opening 40 of the light-reflecting layer 4 on the first substrate 10. The ends of the transmissive-display color filter 82a are substantially aligned with the top edges 65 of the slopes 60 formed at the ends of the thickness-adjusting layer 6, and, in the region where the thickness-adjusting layer 6 forms the slopes 60 at the ends thereof, the ends of the transmissive-display color filter 82a overlie the ends of reflective-display color filter 81a to form an overlap 83. The upper surface of the transmissive-display color filter 82a protuberates at the overlap 83 and, therefore, the total thickness of the reflective-display color filter 81a and the transmissive-display color filter 82a at the overlap 83 is larger than the thicknesses of the reflective-display color filter 81a and the transmissive-display color filter 82a at the other regions.

The first substrate having such a structure is processed, as, for example, in the following.

First, as in Embodiment 1, a reflective metallic layer is formed on the entire surface of the first substrate 10, and then the metallic layer is patterned by photolithography to form the light-reflecting layer 4.

Next, the reflective-display color filter 81a is formed to cover the entire surface of the first substrate 10 by flexography, an ink jet method, or the like, and then an unnecessary region (the transmissive display region 32 other than the overlap 83) is removed by photolithography.

Next, the transmissive-display color filter 82a is formed in the transmissive display region 32 by flexography, an ink jet method, photolithography, or the like.

Next, a photosensitive resin is applied to the entire surface of the first substrate 10 by spin coating, and is subsequently subjected to light exposure and development to form the thickness-adjusting layer 6.

Then, the first transparent electrode 11 and the alignment layer 12 (neither shown in the drawing) are formed as in Embodiment 1.

In this embodiment, the overlap 83 is formed so as to overlap with the region where the thickness-adjusting layer 6 forms the slopes 60 at the ends thereof. The light-reflecting layer 4 is not formed in this region. As a result, since, in the region where the slopes 60 are formed, light from the backlight passes through the overlap 83 and then radiates through the liquid crystal layer, the light is inconspicuous. Thus, display failures occurring at the region where the slopes 60 are formed are inconspicuous and, consequently, the contrast and the quality of displayed images can be improved. Also, since the overlap 83, which does not contribute to displaying images, is disposed at the boundary between the reflective display region 31 and the transmissive display region 32, display failures are hardly caused by errors in the manufacturing process.

Embodiment 7

Figure 9:
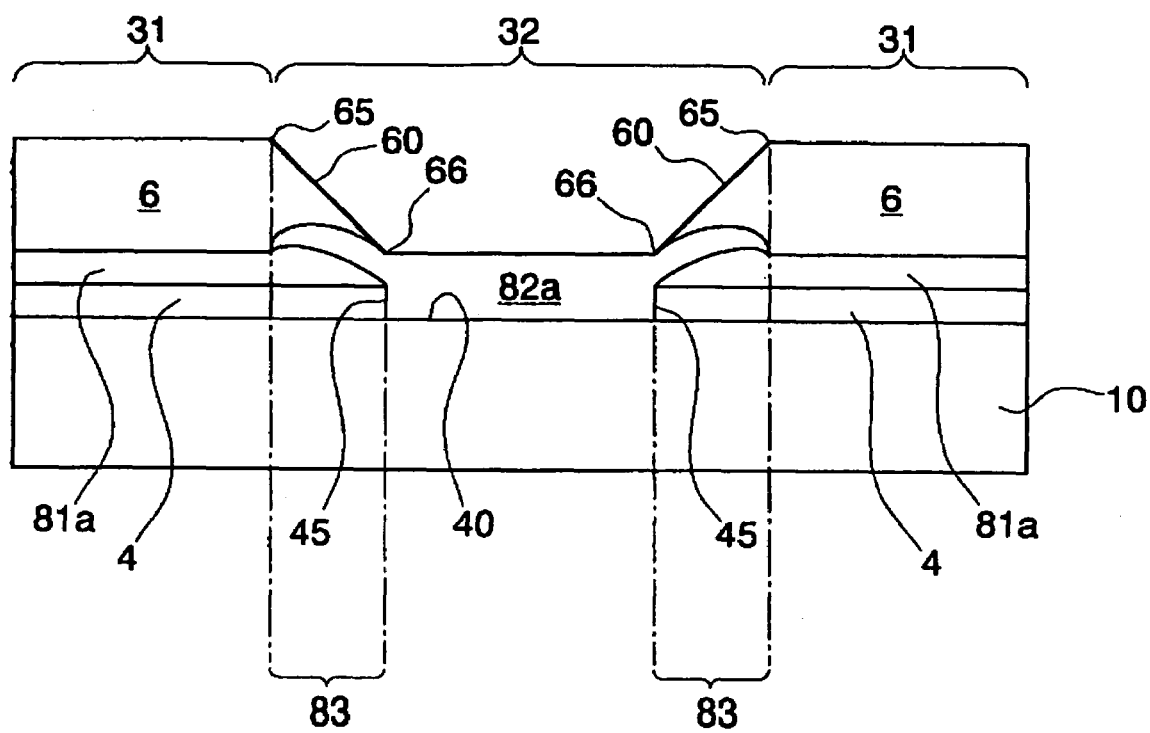
FIG. 9 is a schematic illustration showing the physical relationship between layers on a lower substrate of a liquid crystal device of Embodiment 7.

FIG. 9 is a schematic illustration showing the physical relationship between layers on a lower substrate of a liquid crystal device of Embodiment 7. Embodiment 7 is different from Embodiment 6 in that the edges 45 of the light-reflecting layer 4 are aligned with the bottom edges 66 of the slopes 60 of the thickness-adjusting layer 6 in plan view. In the liquid crystal device of this embodiment, the same parts as in Embodiment 6 are designated by the same reference numerals and the description is not repeated.

The lower substrate of a liquid crystal device of this embodiment is formed as in the manufacturing process of the lower substrate of Embodiment 6 except that the light-reflecting layer 4 is formed such that the edges 45 of the light-reflecting layer 4 overlap with the bottom edges 66 of the slopes 60 of the thickness-adjusting layer 6 in plan view.

In this embodiment, the overlap 83 is formed so as to overlap with the region where the thickness-adjusting layer 6 forms the slopes 60 at the ends thereof. Also, the light-reflecting layer 4 extends into this region. As a result, since, in the region where the slopes 60 are formed, light reflected at the light-reflecting layer 4 passes through the overlap 83 and is then emitted from the liquid crystal layer, the light is inconspicuous. Thus, display failures caused by the formation of the slopes 60 areinconspicuous and, consequently, the contrast and the quality of displayed images can be improved. Also, since the overlap 83, which does not contribute to displaying images, is disposed at the boundary between the reflective display region 31 and the transmissive display region 32, display failures are hardly caused by errors in the manufacturing process.

Embodiment 8

Figure 10:
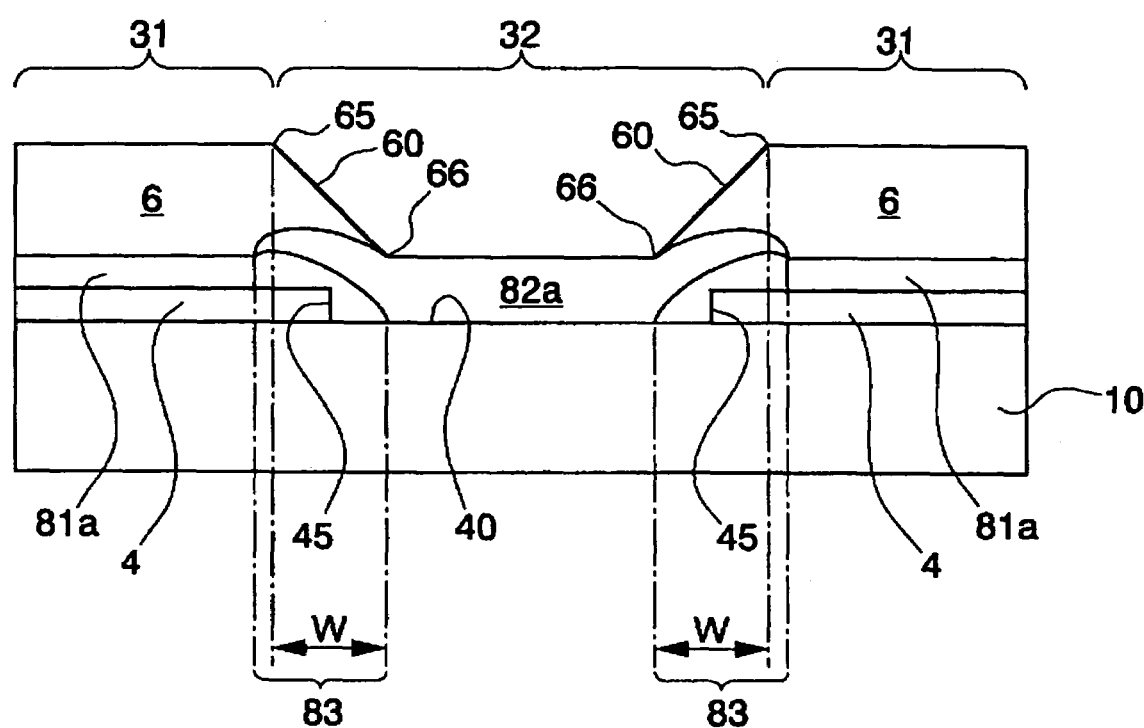
FIG. 10 is a schematic illustration showing the physical relationship between layers on a lower substrate of a liquid crystal device of Embodiment 8.

FIG. 10 is a schematic illustration showing the physical relationship between layers on a lower substrate of a liquid crystal device of Embodiment 8. Embodiment 8 is different from Embodiment 6 in that the edges 45 of the light-reflecting layer 4 are positioned between the top edges 65 and the bottom edges 66 of the slopes 60 of the thickness-adjusting layer 6 when viewed from above. Also, in this embodiment, the edges of the reflective-display color filter 81a slightly extends in the inward direction of the opening 40 in comparison with the bottom edges 66 of the slopes 60, and the edge of the transmissive-display color filter 82a is slightly extends in the outward direction of the opening 40 in comparison with the top edges 65 of the slopes 60. In the liquid crystal device of this embodiment, the same parts as in Embodiment 6 are designated by the same reference numerals and the description is not repeated.

The lower substrate of this embodiment is formed as in the manufacturing process of the lower substrate of Embodiment 6 except that the light-reflecting layer 4 is formed such that the edge 45 of the light-reflecting layer 4 is positioned between the top edges 65 and the bottom edges 66 of the slopes 60 of the thickness-adjusting layer 6, and the positions of the edges of the reflective-display color filter 81a and the transmissive-display color filter 82a are slightly changed.

In this embodiment, the overlap 83 is formed so as to overlap with the region where the thickness-adjusting layer 6 forms the slopes 60 at the ends thereof, and the light-reflecting layer 4 is positioned in this region, but only in the outer region of the overlap. As a result, since, in the region where the slopes 60 are formed, light reflected at the light-reflecting layer 4 and light from the backlight pass through the overlap 83 and are then emitted from the liquid crystal layer, they become inconspicuous. Thus, display failures occurring at the region where the slopes 60 are formed are inconspicuous and, consequently, the contrast and the quality of displayed images can be improved.

Also, since the width of the overlap 83 of the embodiment is larger than that of the slopes 60 in plan view and the slopes 60 are positioned within the overlap 83 when viewed from above, light which does not passes through the overlap 83 is surly prevented from radiating through the slopes 60.

Embodiment 9

Figure 11:
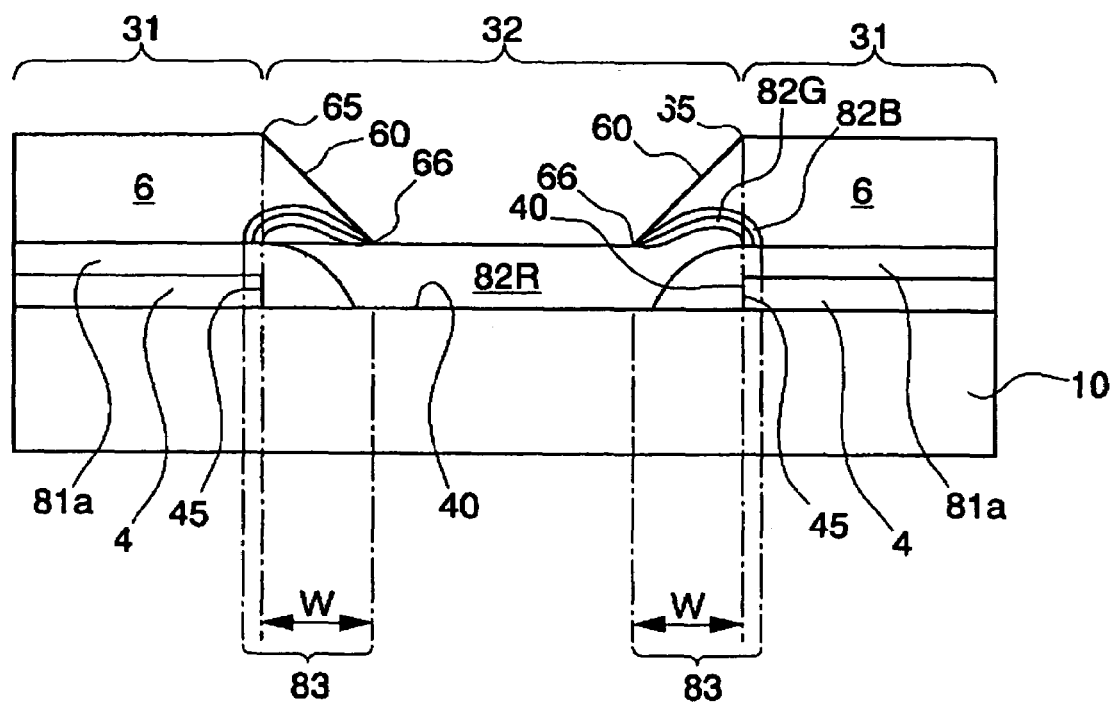
FIG. 11 is a schematic illustration showing the physical relationship between layers on a lower substrate of a liquid crystal device of Embodiment 9.

FIG. 11 is a schematic illustration showing the physical relationship between layers on a lower substrate of a liquid crystal device of Embodiment 9. Embodiment 9 is different from Embodiment 6 in that the overlap 83 is defined by depositing four layers composed of the reflective-display color filter 81a and three transmissive-display color filters 82R, 82G, and 82B which have different colors from each other.

Also, in this embodiment, the edges of the reflective-display color filter 81a slightly extend in the inward direction of the opening 40 in comparison with the bottom edges 66 of the slopes 60, and the edges of the upper two transmissive-display color filters 82G and 82B slightly extend in the outward direction of the opening 40 in comparison with the edges 65 of the slopes 60. In the liquid crystal device of this embodiment, the same parts as in Embodiment 6 are designated by the same reference numerals and the description is not repeated.

The lower substrate of the liquid crystal device of the embodiment is processed as in the following.

First, as in Embodiment 1, a reflective metallic layer is formed on the entire surface of the first substrate 10, and then the metallic film is patterned by photolithography to form the light-reflecting layer 4.

Next, the reflective-display color filter 81a is formed to cover the entire surface of the first substrate 10 by flexography, an ink jet method, or the like, and then an unnecessary region in the transmissive display region 32 is removed by photolithography.

Next, the transmissive-display color filter 82R is formed in the transmissive display region 32 by flexography, an ink jet method, photolithography, or the like. In this instance, first, any one of a red (R), a green (G), and a blue (B) layer (the red transmissive-display color filter 82R in the drawing) is disposed in each transmissive display region 32 to form a predetermined arrangement pattern, and then the other two color layers (the green transmissive-display color filter 82G and the blue transmissive-display color filter 82B in the drawing) are deposited one by one.

Next, a photosensitive resin is applied to the entire surface of the first substrate 10 by spin coating, and is subsequently subjected to light exposure and development to form the thickness-adjusting layer 6.

Then, the first transparent electrode 11 and the alignment layer 12 (neither shown in the drawing) are formed as in Embodiment 1.

In this embodiment, since the four layers having different color tones from one another which are the reflective-display color filter 81a and the three transmissive-display color filters 82R, 82G, and 82B are deposited in. the overlap 83, this overlap 83 serves as a black matrix. Therefore, in the region where the thickness-adjusting layer 6 forms the slopes 60 at the ends thereof, most of transmitted light from the backlight is absorbed into the overlap 83 and, thus, this region is displayed substantially black. Thus, display failures caused by the formation of the slopes 60 are inconspicuous and, consequently, the contrast and the quality of displayed images can be improved.

Also, since the width of the overlap 83 is larger than the width w of the slopes 60 in plan view and the slopes 60 are positioned within the overlap 83 when viewed from above, light which does not pass through the overlap 83 is surely prevented from being emitted from the slopes 60.

Embodiment 10

A TFD active matrix liquid crystal device using the structures according to Embodiments 1 to 9 will now be described.

Figure 12:
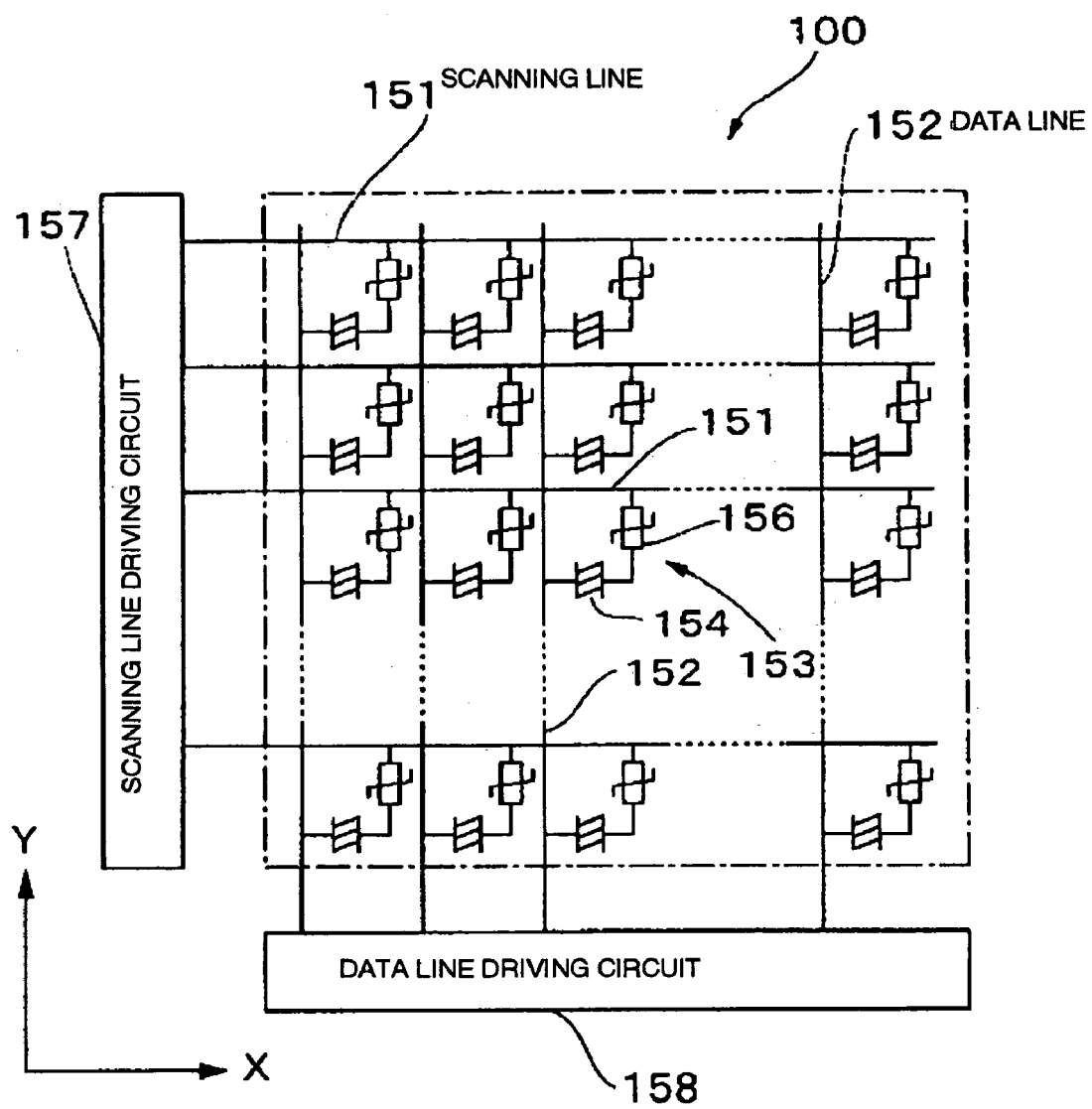
FIG. 12 is a block diagram showing an electrical structure of a transflective TFD active matrix liquid crystal device of the present invention.
Figure 13:
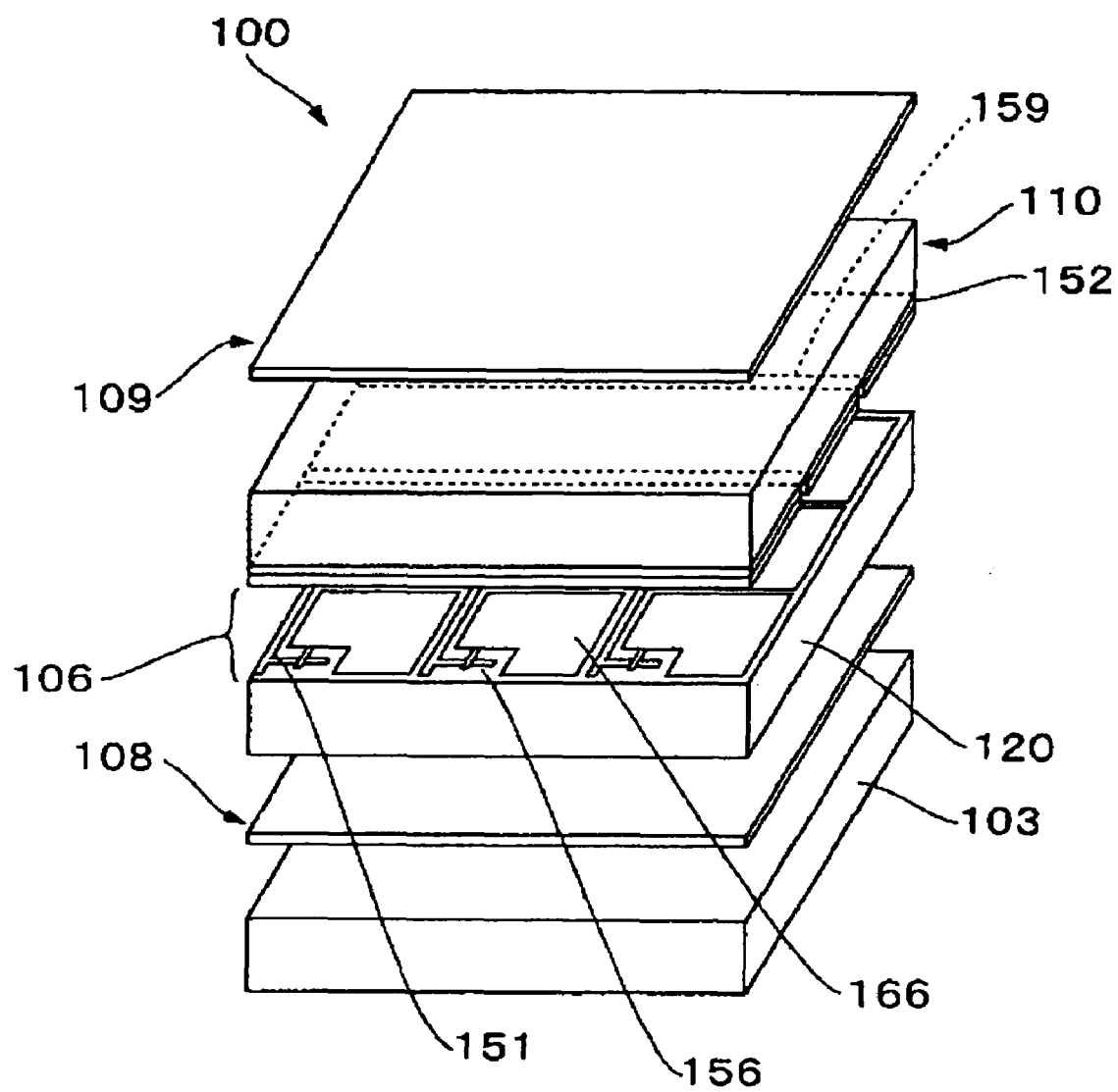
FIG. 13 is an exploded perspective view showing the structure of the liquid crystal device shown in FIG. 12.
Figure 14:
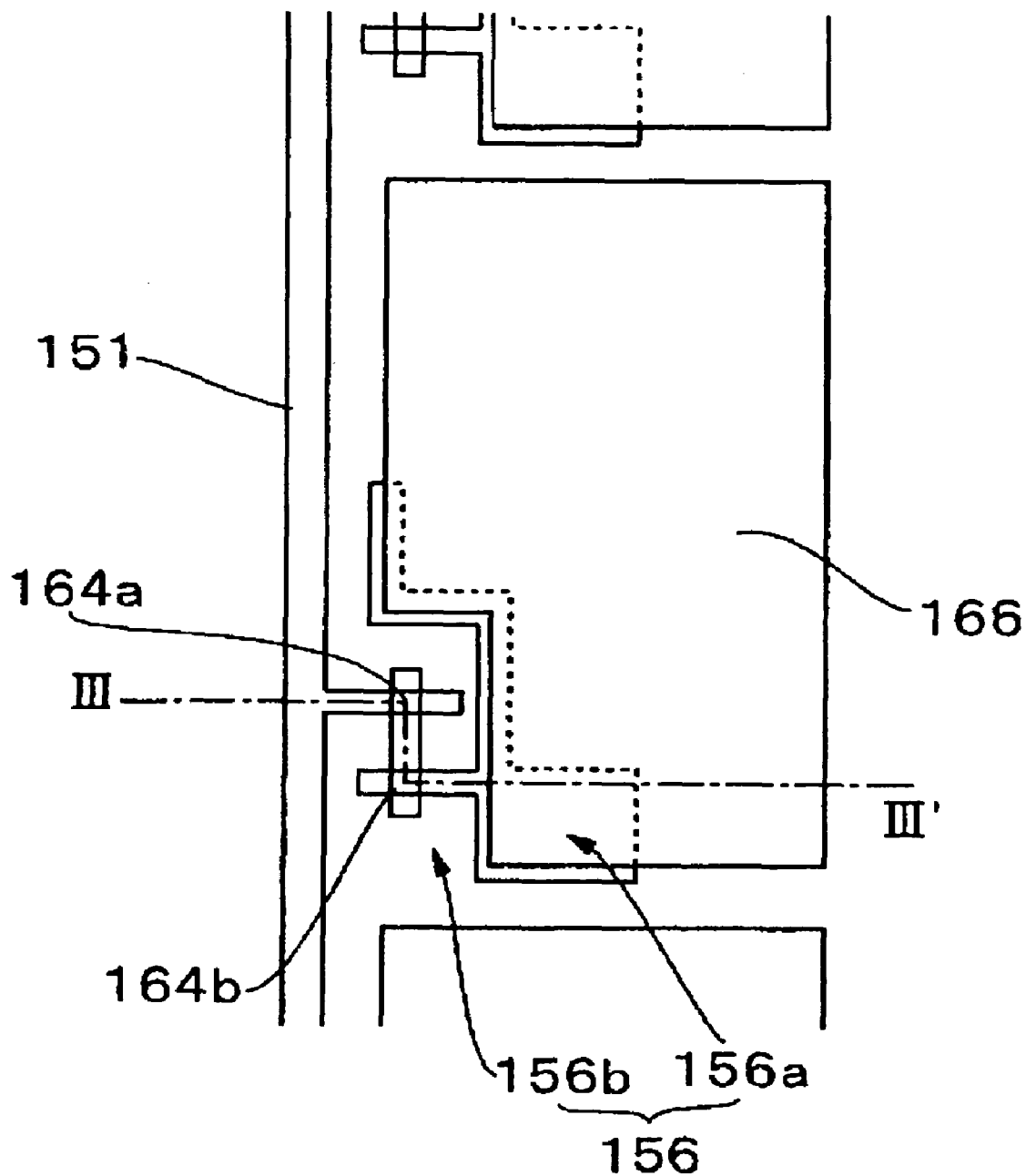
FIG. 14 is a plan view of one of pixel regions on an element substrate of a pair of substrates having liquid crystal therebetween, in the liquid crystal device shown in FIG. 13.
Figure 15:
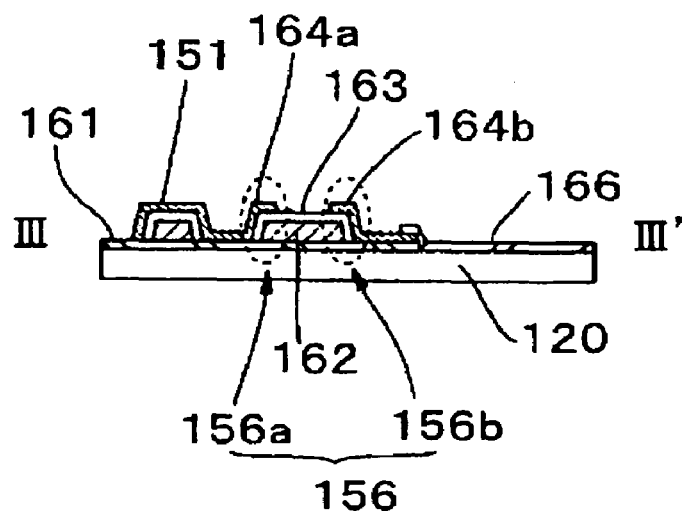
FIGS. 15(A) and (B) are a sectional view taken along line III–III' in FIG. 14 and a perspective view of a TFD element shown in FIG. 14, respectively
Figure 15:
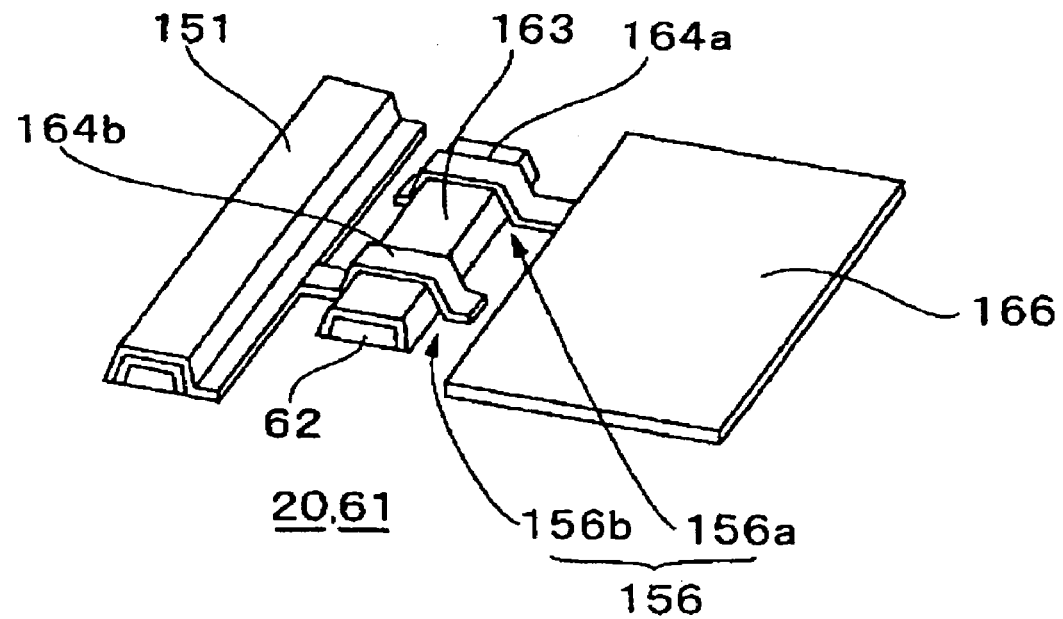

FIG. 12 is a block diagram showing an electrical structure of a liquid crystal device. FIG. 13 is an exploded perspective view showing the structure of the liquid crystal device shown in FIG. 12. FIG. 14 is a plan view of one of pixel regions on an element substrate of a pair of substrates having liquid crystal therebetween. (A) and (B) of FIG. 15 are a sectional view taken along line III–III' in FIG. 14 and a perspective view of a TFD element formed in each pixel, respectively The liquid crystal device 100 shown in FIG. 12 has a plurality of scanning lines 151 running in the row direction (the X direction) and a plurality of data lines 152 running in the column direction (the Y direction). Pixels 153 are formed at the intersections of the scanning lines 151 and the data lines 152. In the pixels 153, a liquid crystal layer 154 and pixel-switching TFD elements 156 (non-linear elements) are connected in series. The scanning lines 151 are driven by a scanning line driving circuit 157 and the data lines 152 are driven by a data line driving circuit 158.

The active matrix liquid crystal device 100 having such a structure has a pair of transparent substrates for holding liquid crystal 106. One of the substrates is an element substrate 120 where the plurality of scanning lines 151 run. The scanning lines 151 are each electrically connected to a pixel electrode 166 via the corresponding TFD element 156. The other of the substrates is an opposing substrate 110 where the plurality of ribbon-shaped data lines 152 are formed of ITO so as to extend in the direction intersecting the scanning lines 151 on the element substrate 120. Shading films 159 referred to as black stripes are disposed between the data lines 152. Hence, the pixel electrodes 166 are surrounded by the shading films 159 and the scanning lines 151 when vied from above.

The liquid crystal 106 uses a conventional TN liquid crystal, in which light is modulated by changing the polarization direction thereof. Accordingly, polarizers 108 and 109 are disposed on the outer surfaces of the opposing substrate 110 and the element substrate 120, respectively. Also, a backlight 103 opposes the polarizer 108.

In the embodiment shown here, the scanning lines 151 are disposed on the element substrate 120 and the data lines 152 are disposed on the opposing substrate 110. However, the data lines may be disposed on the element substrate 120 and the scanning lines may be disposed on the opposing substrate 110.

As shown in FIG. 14 and (A) and (B) of FIG. 15, each TFD element 156 includes a first TFD sub element 156a and a second TFD sub element 156b which are formed on an underlayer 161 deposited on the element substrate 120, and thus the TFD element 156 is configured as a so-called back-to-back structure.

In the TFD elements 156, therefore, the non-linear current/voltage characteristics become symmetrical in the positive and negative directions. The underlayer 161 is formed of, for example,. tantalum oxide ($Ta_2O_5$) having a thickness of 50 to 200 nm.

The first TFD sub element 156a and the second TFD sub element 156b include a first metallic film 162, an insulating film 163 formed on the first metallic film 162, and second metallic films 164a and 164b formed on the surface of the insulating film 163 separately. The first metallic film 162 is formed of, for example, elemental Ta film or a Ta-W (tungsten) alloy film having a thickness of 100 to 500 nm. The insulating film 163 is formed of, for example, a tantalum oxide ($Ta_2O_5$) having a thickness of 10 to 35 nm produced by anodic oxidation of the surface of the first metallic film 162.

The second metallic films 164a and 164b are formed of a shading metallic film such as chromium (Cr) to a thickness of about 50 to 300 nm. One second metallic film 164a serves as one of the scanning lines 151 without being processed, and the other second metallic film 164b is connected to one of the pixel electrodes 166 formed of ITO or the like.

In the liquid crystal device 100 having such a structure, the pixel regions 3 described in Embodiments 1 to 9 are defined by the regions between the pixel electrodes 166 and the data lines 152.

Specifically, the element substrate 120, the opposing substrate 110, the pixel electrodes 166, the data lines 152, and the shading films 159 correspond to the first substrate 10, second substrate 20, the first electrodes 11, the second electrodes 21, and the shading films 9 in Embodiments 1 to 9, respectively. The light-reflecting layer 4, the reflective-display color filters 81 (81a), the transmissive-display color filters 82 (82a, 82R, 82G, 82B), and the thickness-adjusting layer 6 described with reference to FIGS. 1 to 11 are disposed under the pixel electrodes 166.

Embodiment 11

A TFT active matrix liquid crystal device using the structures according to Embodiments 1 to 9 will now be described.

Figure 16:
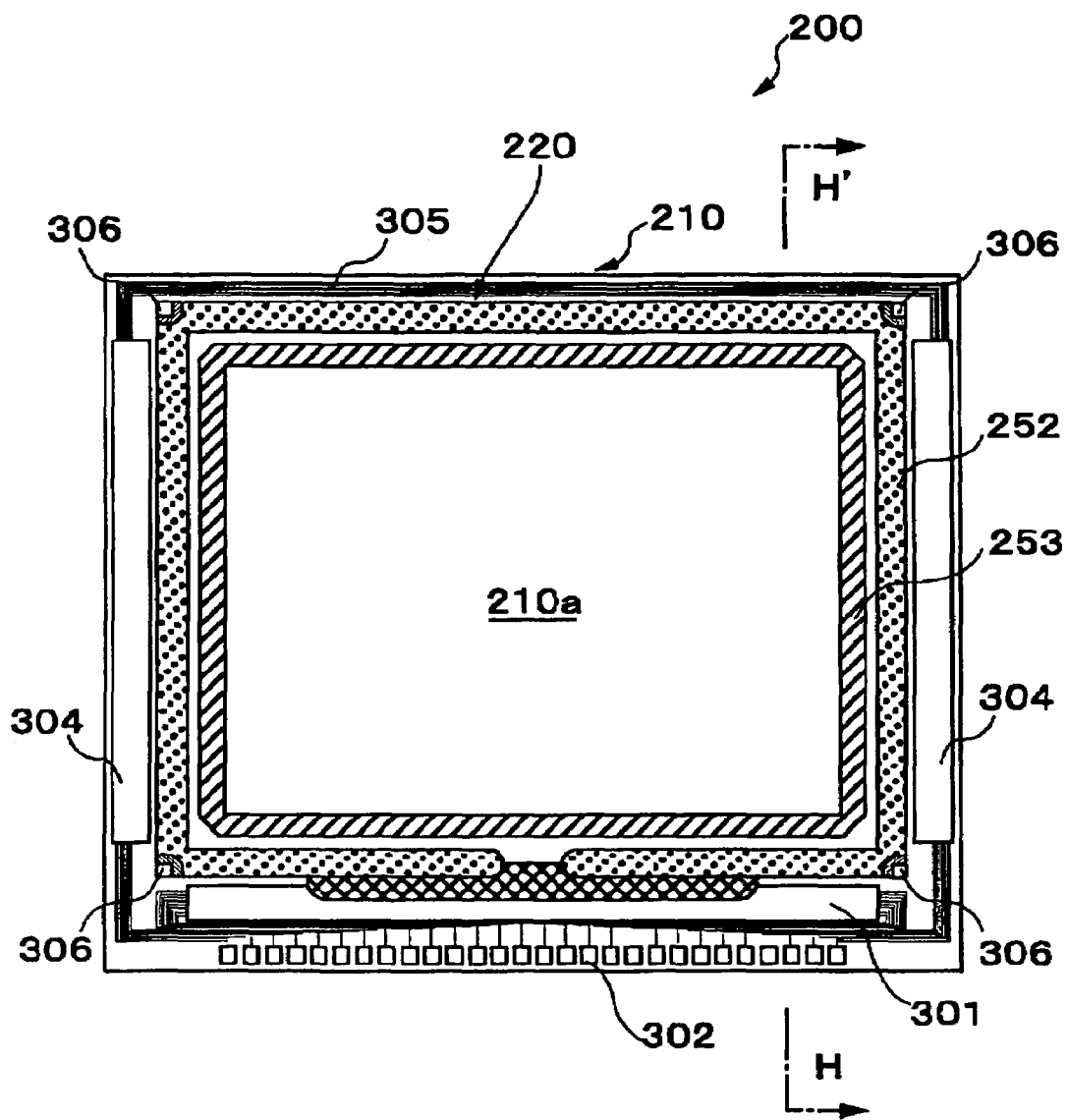
FIG. 16 is a plan view of a transflective TFT active matrix liquid crystal device of the present invention viewed from an opposing substrate side.
Figure 17:
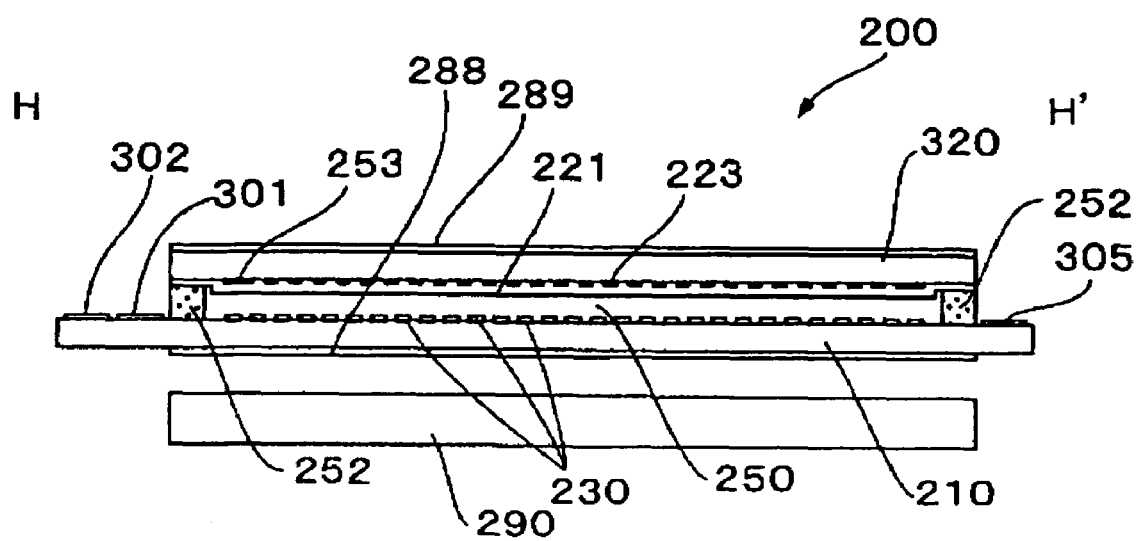
FIG. 17 is a sectional view taken along line H–H' in FIG. 16.
Figure 18:
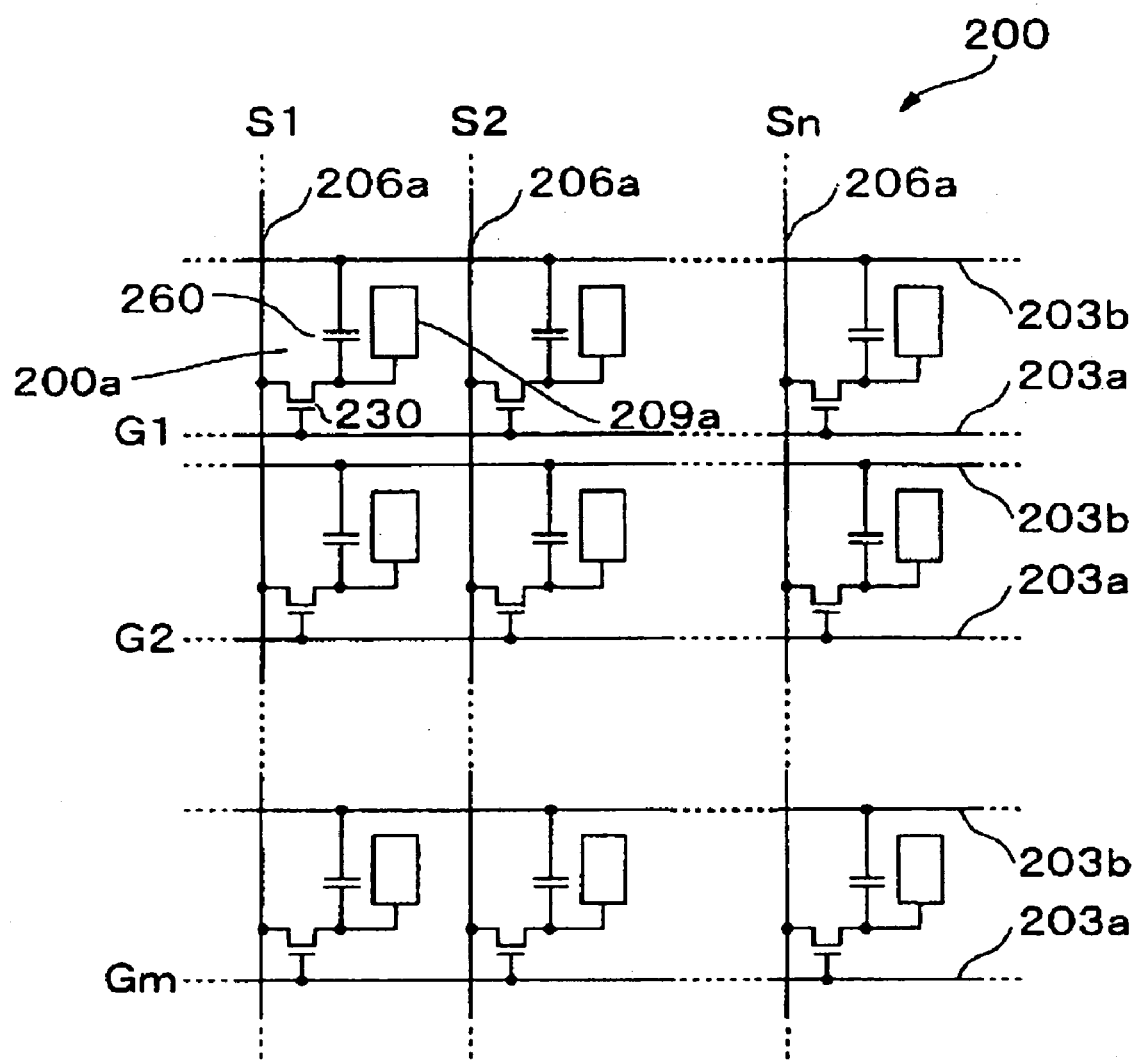
FIG. 18 is an equivalent circuit of elements, wires, and the like included in a plurality of pixels arrayed in a matrix in the liquid crystal device shown in FIG. 16.

FIG. 16 is a plan view of a TFT active matrix liquid crystal device including components viewed from an opposing substrate side, and FIG. 17 is a sectional view taken along line H–H' in FIG. 16. FIG. 18 is an equivalent circuit of elements, wires, and the like included in a plurality of pixels arrayed in a matrix in an image-displaying region of a liquid crystal device.

In FIGS. 16 and 17, a liquid crystal device 200 of this embodiment has a TFT array substrate 210 and an opposing substrate 220 bonded together with a sealant 252, and liquid crystal 250 is sealed in the region (liquid crystal-sealed region) partitioned by the sealant 252. Polarizers 288 and 289 are disposed on the TFT array substrate 210 and the opposing substrate 220, respectively, and the polarizer 288 opposes a backlight 290.

A parting surrounding 253 is formed of a shading material in the internal region surrounded by the sealant 252. A data line driving circuit 301 and packing terminals 302 are disposed along one side of the TFT array substrate 210 outside the region surrounded by the sealant 252. Scanning line driving circuits 304 are disposed along two sides adjoining the one side. The other side of the TFT array substrate 210 is provided with a plurality of wires 305 for connecting the scanning line driving circuits 304 disposed on the both sides of the image display region. In addition, a pre-charging circuit or a testing circuit may be disposed under the parting surrounding 253 or the like. Also, a substrate conductor 306 for electrically connecting the TFT array substrate 210 and the opposing substrate 220 is formed in at least one corner of the opposing substrate 220.

Instead of forming the data line driving circuit 301 and the scanning line driving circuits 304 on the TFT array substrate 210, for example, a TAB (tape automated bonding) substrate including a driving LSI may be electrically and mechanically connected to terminals disposed along a side of the TFT array substrate 210 via an anisotropic conductive layer. In the liquid crystal device 200 of the embodiment, the liquid crystal 250 is also used in a TN mode.

In the liquid crystal device 200 having the above-described structure, a plurality of pixels 200a are arrayed in a matrix and the pixels 200a each have a pixel electrode 209a and a pixel-switching TFT 230 for driving the pixel electrode 209a, as shown in FIG. 18. Data lines 206a for supplying pixel signals S1 to Sn are electrically connected to sources of respective TFTs 230. The pixel signals S1 to Sn to be written into the data lines 206a may be supplied one by one in numerical order or supplied by groups defined by a plurality of adjacent data lines 206a. The gates of the TFTs 230 are electrically connected to the scanning lines 203a to which pulsed scanning signals G1 to Gn are supplied one by one in numerical order at a predetermined timing. The pixel electrodes 209a are electrically connected to the drains of the TFTs 230. The pixel signals S1 to Sn supplied from the data lines 206a are written into the respective pixels at a predetermined timing by allowing the TFTs 230, acting as switching elements, to be on for a predetermined period of time. Thus, the predetermined-level pixel signals S1 to Sn written into the liquid crystal via the pixel electrodes 209a are held for a predetermined period of time between the pixel electrodes 209a and an opposing electrode 221 of the opposing substrate 220, as shown in FIG. 17.

The orientation or the order of the liquid crystal molecules of the liquid crystal 250 is changed to modulate light according to the level of the voltage applied to the liquid crystal 250 and, thus, displayed images can gradate. In the case of a normally white mode, the amount of incident light passing though the liquid crystal 250 decreases according to applied voltage. In the case of normally black mode, the amount of incident light passing through the liquid crystal 250 increases according to applied voltage. As a result, light contrasted according to the pixel signals S1 to Sn is emitted from the liquid crystal device 200, as a whole.

In order to prevent the pixel signals S1 to Sn from leaking, storage capacitors 260 may be provided in parallel with liquid crystal capacitors disposed between the pixel electrodes 209a and the opposing electrode 221. For example, the voltage of the pixel electrodes 209a is held in the storage capacitors 260 for a period of time thousands times longer than that for which source voltage is applied.

Thus, the resulting liquid crystal device 200 has improved charge holding characteristics and a high contrast ratio. The storage capacitors 260 may be disposed using capacitor lines 203b for forming the storage capacitors 260, as shown in FIG. 18, or using the scanning lines 203a.

Figure 19:
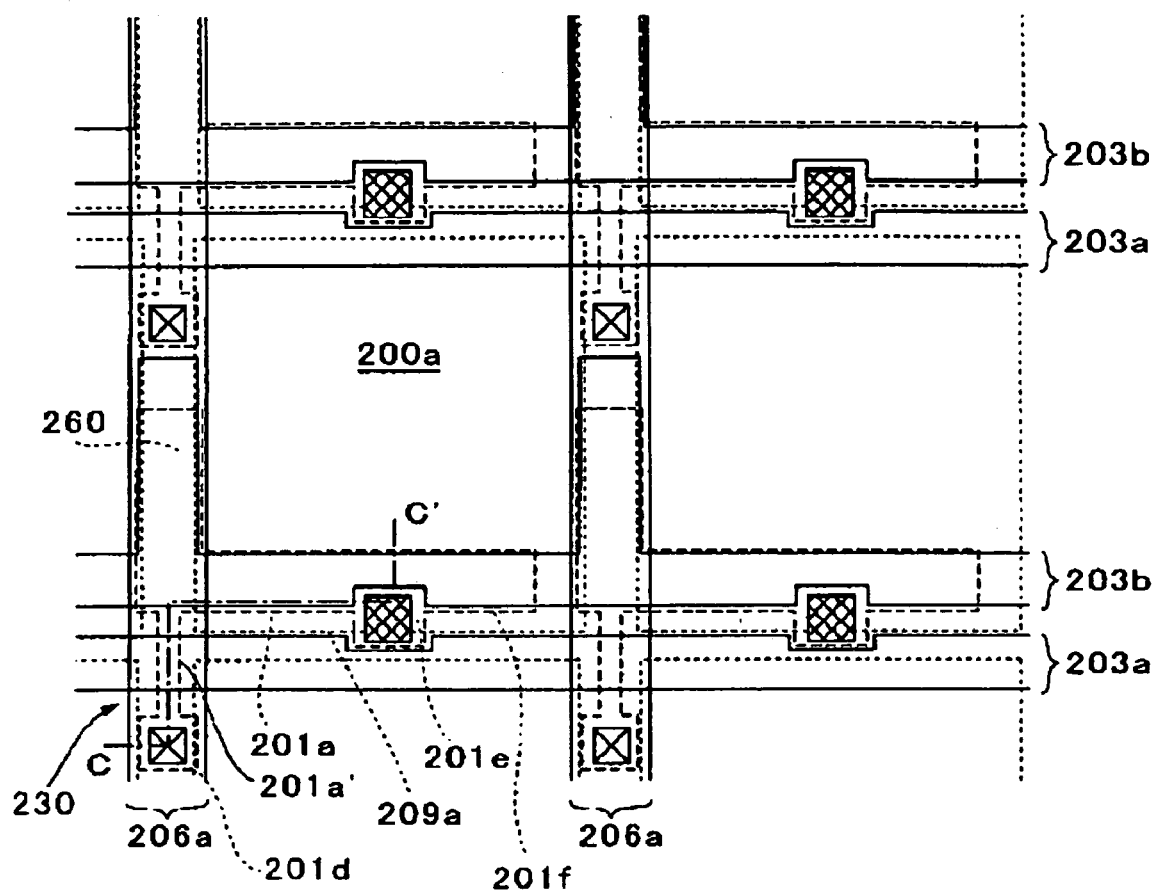
FIG. 19 is a plan view showing pixels formed in a TFT array substrate of the liquid crystal device shown in FIG. 16.
Figure 20:
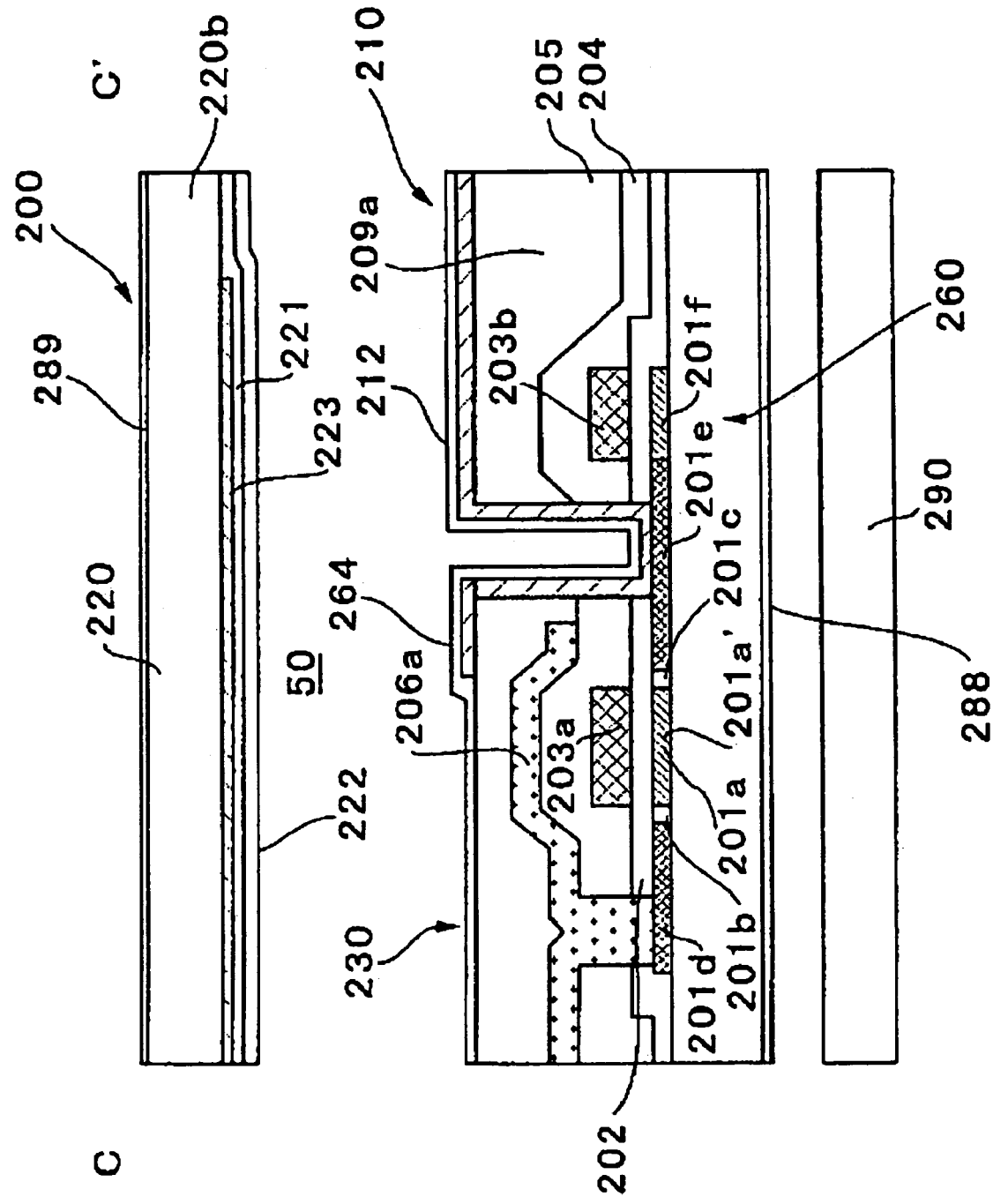
FIG. 20 is a sectional view of part of a pixel of the liquid crystal device shown in FIG. 16, taken along a position corresponding to line C–C' in FIG. 19.

FIG. 19 is a plan view of adjacent pixels of a plurality of pixels on a TFT array substrate used in a liquid crystal device according to the present embodiment. FIG. 20 is a sectional view of part of the liquid crystal device according to the present embodiment taken along a position corresponding to line C–C' in FIG. 19.

In FIG. 19, a plurality of pixel electrodes 209a formed of transparent ITO (indium tin oxide) films are arrayed in a matrix on the TFT array substrate 210. The pixel-switching TFTs 230 are connected to the respective pixel electrodes 209a. The data lines 206a, the scanning lines 203a, and the capacitor lines 203b are formed along the longitudinal and the transverse boundaries between the pixel electrodes 209a. The TFTs 230 are connected to the data lines 206a and the scanning lines 203a.

Specifically, the data lines 206a are electrically connected to heavily doped source regions 201d of the TFTs 230 via contact holes and the pixel electrodes 209a are electrically connected to heavily doped drain regions 201e of the TFTs 230 via contact holes. The scanning lines 203a extend so as to oppose channel regions 201a' of the TFTs 230. The storage capacitors 260 each have a lower electrode 241 formed by giving conductivity to an extension 201f of a semiconductor film 201 for forming the pixel-switching TFTs 230 and one of the capacitor lines 203b, which is in the same layer as the scanning lines 203a, overlying the lower electrode 241 to serve as an upper electrode.

In the liquid crystal device 200 having the above-described structure, an island-shaped semiconductor layer 201a having a thickness of 50 to 100 nm is formed on the surface of the TFT array substrate 210. A silicon oxide gate insulating layer 202 having a thickness of about 50 to 150 nm is formed on the surface of the semiconductor layer 201a and the scanning lines 203a having a thickness of 300 to 800 nm are formed to serve as gate electrodes on the surface of the gate insulting layer 202. The regions where the semiconductor layer 201a opposes the scanning lines 203a with the gate insulating layer 202 therebetween are the channel regions 201a'. One side of the channel regions 201a' has a source region including a lightly doped source region 201b and the heavily doped source region 201d, and the other side has a drain region including a lightly doped drain region 201c and the heavily doped drain region 201e.

A first insulating interlayer 204 formed of silicon oxide having a thickness of 300 to 800 nm and a second insulating interlayer 205 formed of silicon nitride having a thickness of 100 to 300 nm are deposited on the surface of the pixel-switching TFTs 230. The data lines 206a having a thickness of 300 to 800 nm are disposed on the surface of the first insulating interlayer 204. The data lines 206a are each electrically connected to the heavily doped source region 201d via a contact hole formed in the first insulating interlayer 204.

The ITO pixel electrodes 209a are deposited on the second insulating interlayer 205. The pixel electrodes 209a are electrically connected to drain electrodes 206b via contact holes formed in the second insulating interlayer 205. The pixel electrodes 209a are provided with a polyimide alignment layer 212 on the surface thereof. The alignment layer 212 is formed by rubbing a polyimide film.

Also, the extensions 201f (the lower electrodes) of the heavily doped drain regions 201e oppose the capacitor lines 203b, which are in the same layer as the scanning lines 203a and act as the upper electrodes, having therebetween the insulating film (a dielectric film) formed simultaneously with the gate insulating films 202, thus forming the storage capacitors 260.

Preferably, the TFTs 230 have a LDD structure, as described above. However, the TFTs may have an offset structure in which the regions corresponding to lightly doped source regions 201b and the lightly doped drain regions 201c are not implanted with impurity ions. Also, the TFTs 230 may be self-aligned TFTs prepared by self-alignment in which a high concentration of impurity ions are implanted using the gate electrodes (part of the scanning lines 203a) as a mask to form the heavily doped source regions and drain regions.

Although each source-drain region has only one gate electrode (part of the scanning line 203a) of the TFT 230 in the embodiment, the source-drain region may have two or more gate electrodes. In this instance, the same signals are applied to the gate electrodes. The TFTs 230 having a dual-gate (double-gate) structure or a triple-gate structure or more, as described above, can prevent current from leaking from the junction of the channels with the source-drain regions, thus reducing current in an off state. By forming at least one of these gate electrodes in the LDD structure or the offset structure, current in the off state is further reduced, and thus, the resulting switching elements can be stable.

In FIG. 20, the shading films 223 referred to as black matrix or black stripes are disposed on the opposing substrate 220 so as to oppose the longitudinal and the transverse boundaries between the pixel electrodes 209a overlying the TFT array substrate 210, and the opposing electrode 221 is formed of ITO on the shading films 223. A polyimide alignment layer 222 is disposed on the opposing electrode 221, and the alignment layer 222 is formed by rubbing a polyimide film.

The pixel regions 3 described in Embodiments 1 to 9 are defined by the regions between the pixel electrodes 209a and the opposing electrode 221 in the liquid crystal device 200 having the above-described structure. Specifically, the TFT array substrate 210, the opposing substrate 220, the pixel electrodes 209a, the opposing electrode 221, and the shading films 223 correspond to the first substrate 10, the second substrate 20, the first electrodes 11, the second electrodes 21, and the shading films 9 in Embodiments 1 to 9, respectively. The light-reflecting layer 4, the reflective-display color filters 81 (81a), the transmissive-display color filters 82 (82a, 82R, 82G, 82B), and the thickness-adjusting layer 6 described with reference to FIGS. 1 to 11 are disposed under the pixel electrodes 209a.

[Application of the Liquid Crystal Device to Electronic Apparatus]

The reflective or the transflective liquid crystal device having such a structure is used as a display of various electronic apparatuses. An example of the apparatuses will now be described with reference to FIGS. 21, 22, and 23.

Figure 21:
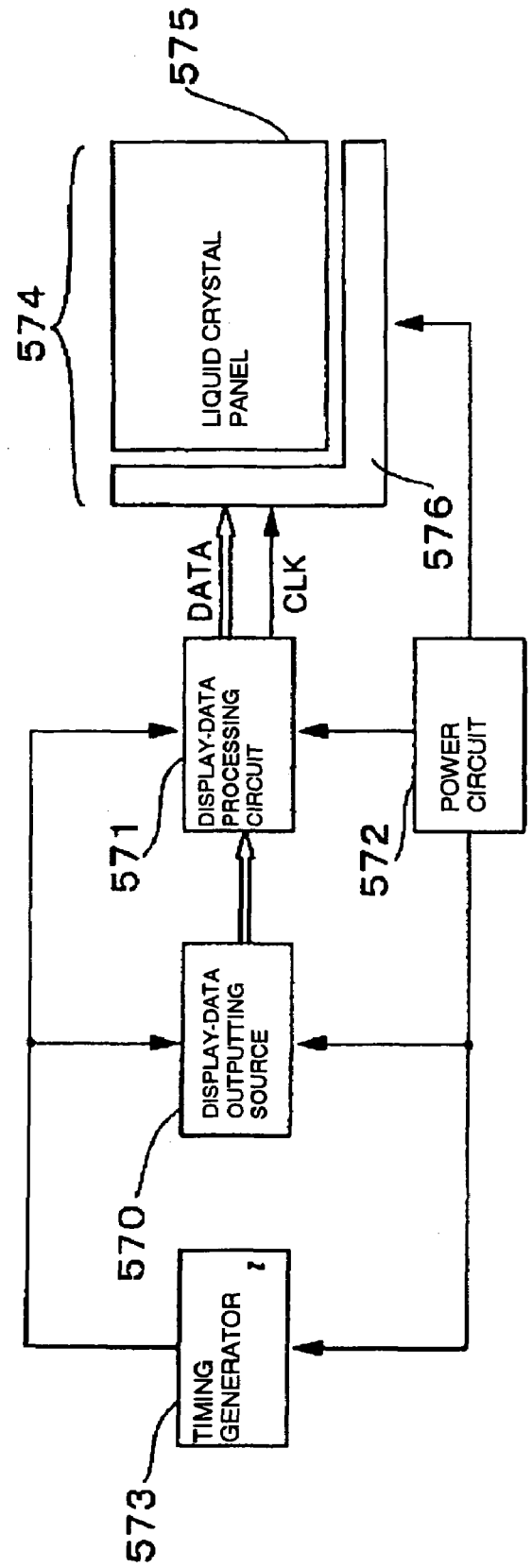
FIG. 21 is a block diagram of the circuital structure of an electronic apparatus using a liquid crystal device of the present invention as a display.

FIG. 21 is a block diagram of the circuit structure of an electronic apparatus using a liquid crystal device of the present invention as a display.

In FIG. 21, the electronic apparatus has a display-data outputting source 570, a display-data processing circuit 571, a power circuit 572, a timing generator 573, and a liquid crystal device 574. The liquid crystal device 574 has a liquid crystal panel 575 and a driving circuit 576. The liquid crystal devices 1, 100, and 200 of the present invention are used as the liquid crystal device 574.

The display-data outputting source 570 has memories, such as a ROM (read only memory) and a RAM (random access memory), a storage unit, such as a disk, and a tuning circuit for syntonizing and outputting digital image signals. The display-data outputting source 570 supplies display data to the display-data processing circuit 571, according to various clock signals generated by the timing generator 573.

The display-data processing circuit 571 has various kinds of known circuits, such as a serial-parallel converting circuit, an amplifying-inverting circuit, a rotation circuit, a gamma control circuit, and a clamp circuit, and it processes inputted display data and supplies image signals to the driving circuit 576 with clock signals CLK. The power circuit 572 supplies a predetermined voltage to the components.

Figure 22:
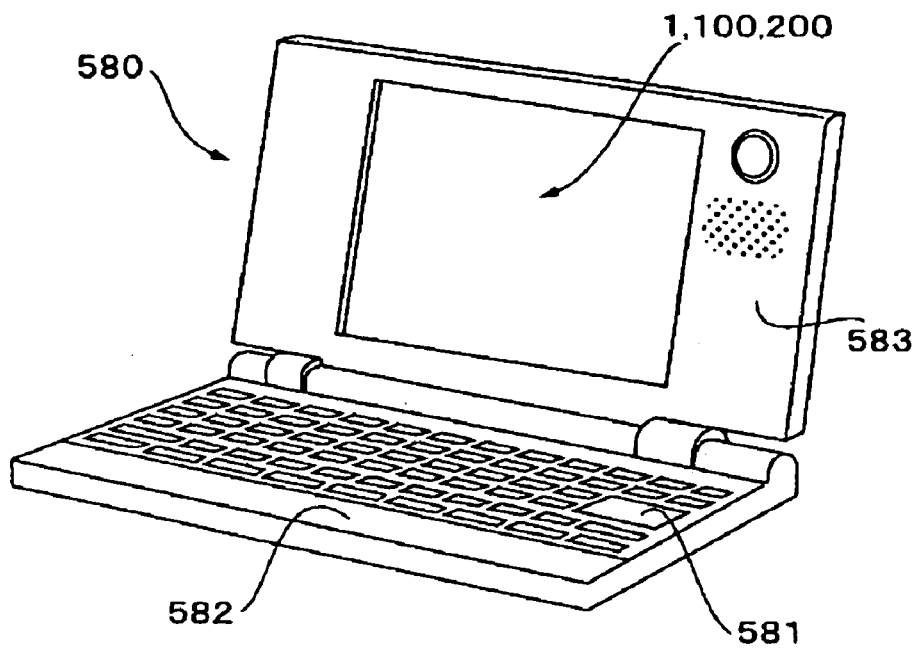
FIG. 22 is a schematic illustration of a mobile personal computer which is an example of electronic apparatuses using a liquid crystal device according to the present invention.

FIG. 22 shows a mobile computer according to an electronic apparatus of the present invention. The personal computer 580 shown here has a body 582 including a keyboard 581 and a liquid crystal display unit 583. The liquid crystal display unit 583 includes the liquid crystal. device 1, 100, or 200 of the present invention.

Figure 23:
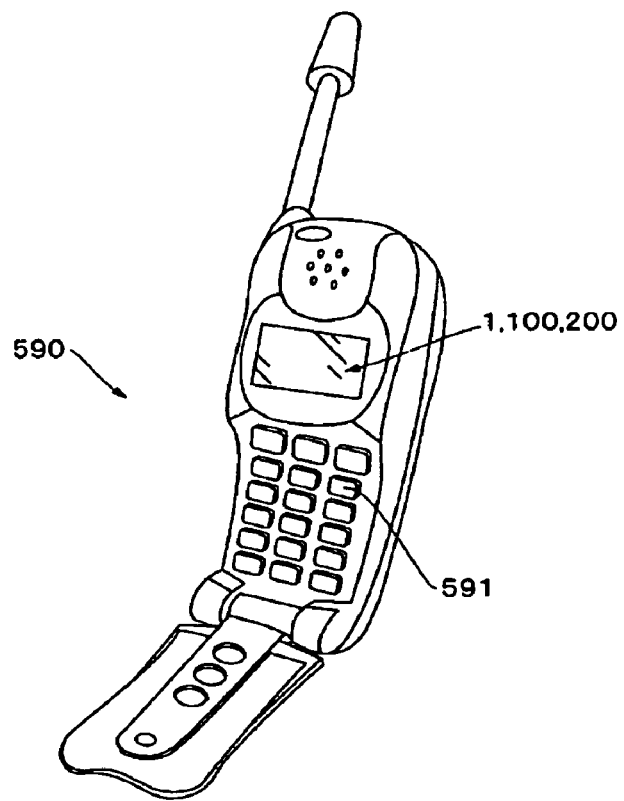
FIG. 23 is a schematic illustration of a cellular phone which is an example of electronic apparatuses using a liquid crystal device according to the present invention.
Figure 24:
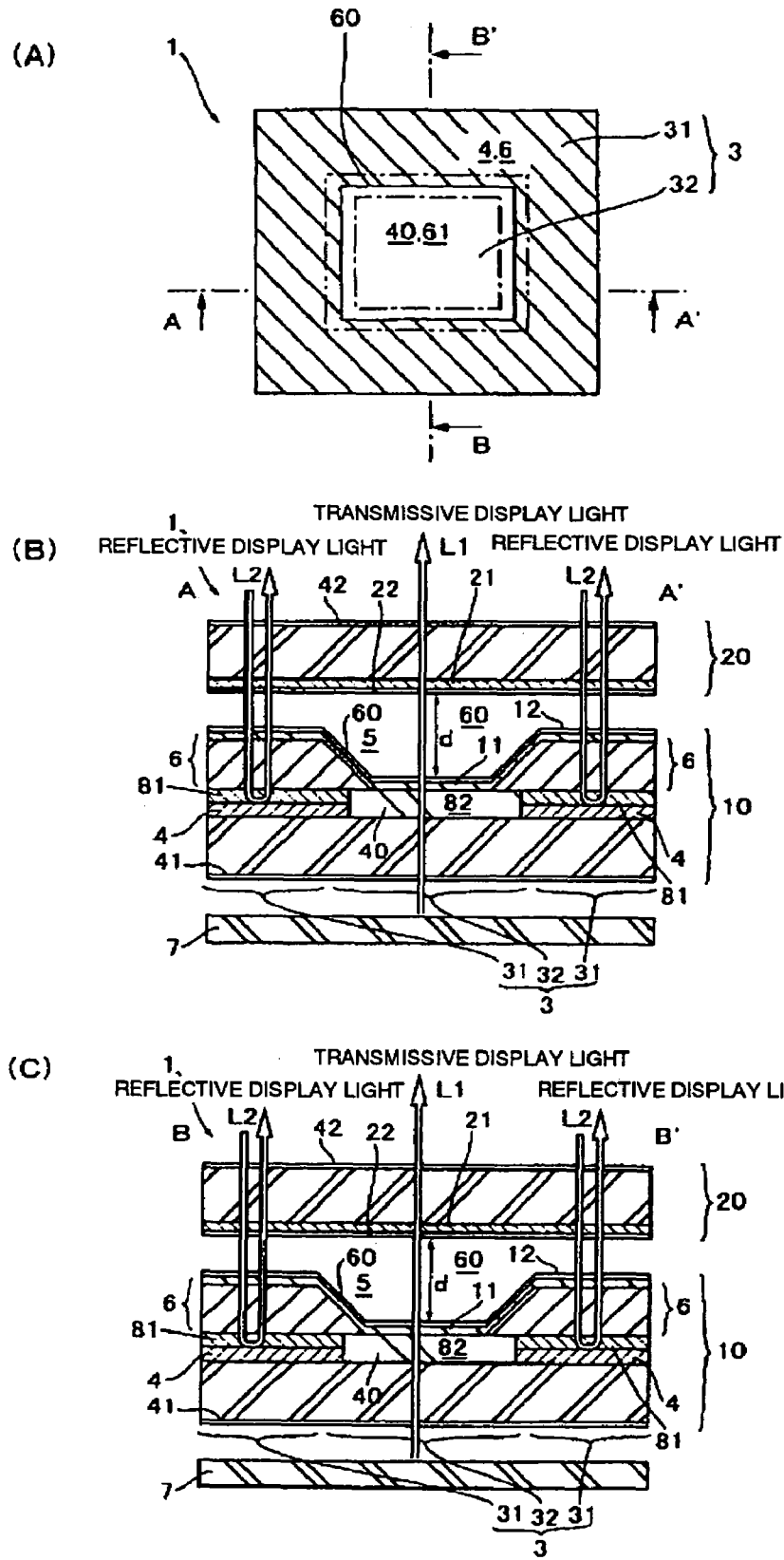
FIGS. 24(A), (B) and (C) are a schematic plan view of one of a plurality of pixel regions formed in a matrix of a known transflective liquid crystal device in (A), a sectional view taken along line A–A' in (B), and a sectional view taken along line B–B' in (C), respectively.
Figure 25:
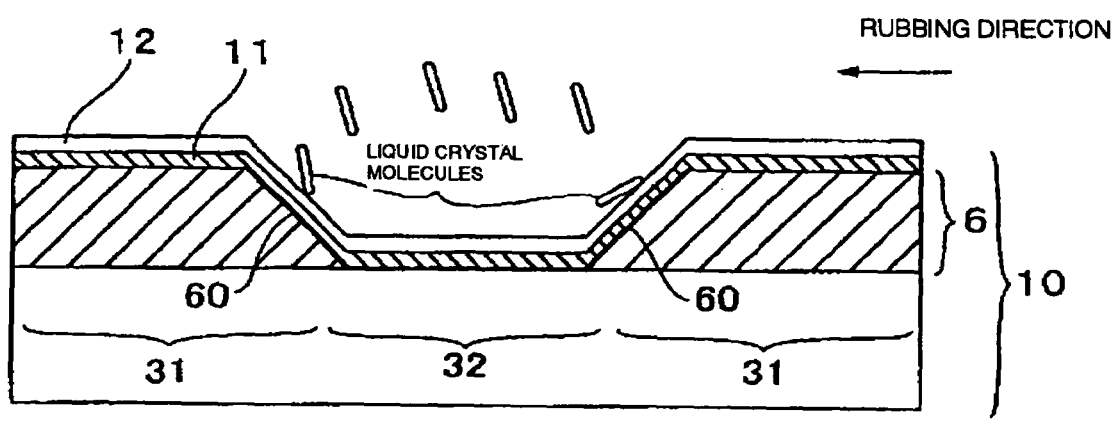
FIG. 25 is a schematic illustration showing an alignment defect of liquid crystal molecules occurring in the slopes of a thickness-adjusting layer of a known transflective liquid crystal device.

FIG. 23 shows a cellular phone according to an electronic apparatus of the present invention. The cellular phone 590 shown here has a plurality of operation buttons 591 and a display using the liquid crystal device 1, 100, or 200 of the present invention.

As described above, in multi-gap type liquid crystal devices according to the present invention in which the thickness of the liquid crystal layer between the transmissive display regions and the reflective display regions in one pixel is changed into an adequate value, and in electronic apparatuses using the liquid crystal device, light does not pass through the boundaries between the transmissive display regions and the reflective display regions where a light-reflecting layer overlaps with the slopes formed at the ends of the thickness-adjusting layer. Therefore, the amount of light passing through the slopes can be reduced in a transmissive mode. Thus, even if the retardation is not appropriate at the boundaries between the transmissive display regions and the reflective display regions or the orientation of the liquid crystal molecules are not aligned, the resulting liquid crystal device can display high-quality images.

What is claimed is:

1. A transflective device comprising:
   a first substrate;
   a second substrate;
   a liquid crystal layer held between the first substrate and the second substrate;
   a pixel region including a reflective display region, a transmissive display region, and electrodes;
   a light-reflecting layer formed between the liquid crystal layer and the first substrate; and
   a thickness-adjusting layer setting the thickness of the liquid crystal layer in at least a portion of the reflective display region to be smaller than the thickness of the liquid crystal layer in at least a portion of the transmissive display region, the thickness adjusting layer having an edge that faces the transmissive display region, the edge being at a thinnest portion of the thickness-adjusting layer that is nearest to a substrate over which the thickness layer is formed, the thickness-adjusting layer further having a sloping section that extends from the edge in a direction extending away from the corresponding substrate and extending away from the transmissive display region further into the reflective display region, the edge of the thickness adjusting layer and the sloping section at least adjacent to the edge being overlapped by a portion of the light-reflecting layer.

2. The transflective device according to claim 1, wherein the thickness-adjusting layer is formed between the liquid crystal layer and the first substrate.

3. The transflective liquid crystal device according to claim 1, further comprising reflective-display color filters in the reflective display regions and transmissive-display color filters, which are colored more strongly than the reflective-display color filters, in the transmissive display regions.

4. The transflective liquid crystal device according to claim 1, wherein the slopes of the thickness-adjusting layer at a transition between the reflective display regions and the transmissive display regions have a width of 8 μm or less.

5. The transflective liquid crystal device according to claim 1, wherein a twist angle of liquid crystal in the liquid crystal layer is 90° or less.

6. An electronic apparatus comprising a transflective liquid crystal device as set forth in claim 1.

7. The transflective device as claimed in claim 1, wherein the edges of the slopes of the thickness adjusting layer are at a thinnest section of the thickness adjusting layer.

* * * * *